(12) United States Patent
Choi

(10) Patent No.: US 11,163,689 B2
(45) Date of Patent: Nov. 2, 2021

(54) MEMORY SYSTEM AND OPERATING METHOD THEREOF

(71) Applicant: SK hynix Inc., Gyeonggi-do (KR)

(72) Inventor: Hae-Gi Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 247 days.

(21) Appl. No.: 16/287,626

(22) Filed: Feb. 27, 2019

(65) Prior Publication Data

US 2020/0012603 A1 Jan. 9, 2020

(30) Foreign Application Priority Data

Jul. 6, 2018 (KR) ........................ 10-2018-0078695

(51) Int. Cl.
| | |
|---|---|
| *G06F 12/0891* | (2016.01) |
| *G06F 12/1009* | (2016.01) |
| *G06F 12/02* | (2006.01) |
| *G06F 9/46* | (2006.01) |
| *G06F 9/54* | (2006.01) |

(52) U.S. Cl.
CPC .......... *G06F 12/0891* (2013.01); *G06F 9/466* (2013.01); *G06F 9/544* (2013.01); *G06F 12/0238* (2013.01); *G06F 12/1009* (2013.01)

(58) Field of Classification Search
CPC ............. G06F 12/0891; G06F 12/1009; G06F 12/0238; G06F 9/466; G06F 9/544
See application file for complete search history.

(56) References Cited

U.S. PATENT DOCUMENTS

| | | | |
|---|---|---|---|
| 9,141,531 B1* | 9/2015 | Salehudin | .............. G11B 19/00 |
| 9,323,465 B2 | 4/2016 | Flynn et al. | |
| 2016/0344834 A1 | 11/2016 | Das | |

FOREIGN PATENT DOCUMENTS

KR 10-2017-0071524 6/2017

* cited by examiner

*Primary Examiner* — Kalpit Parikh
(74) *Attorney, Agent, or Firm* — IP & T Group LLP

(57) ABSTRACT

A memory system may include: a nonvolatile memory device; a write buffer; and a controller suitable for: checking whether first write data have been committed at a point of time that a flush operation is performed on the write buffer, separating the flush operation into first and second flush operations which do not overlap each other but are consecutive to each other, according to the check result, and performing the first and second flush operations, when the first write data grouped into a transaction and second write data, which are not grouped into a transaction, are mixed and stored in the write buffer according to the sequence of the write data, among the write data stored in the write buffer, the controller may select and may store the first write data which are committed, in a first storage region of the nonvolatile memory device during the first flush operation.

20 Claims, 13 Drawing Sheets

MEMORY SYSTEM AND OPERATING METHOD THEREOF

CROSS-REFERENCE TO RELATED APPLICATION

This application claims priority under 35 U.S.C. § 119 to Korean Patent Application No. 10-2018-0078695 filed on Jul. 6, 2018, which is incorporated herein by reference in its entirety.

BACKGROUND

1. Field

Exemplary embodiments relate to a memory system, and more particularly, to a memory system which stores a plurality of write data grouped into transactions.

2. Discussion of the Related Art

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSDs).

SUMMARY

Various embodiments are directed to a memory system which can effectively store a plurality of write data grouped into transactions, and an operating method thereof.

In an embodiment, a memory system may include: a nonvolatile memory device; a write buffer suitable for temporarily storing a plurality of write data received from a host; and a controller suitable for: checking whether first write data have been committed at a point of time that a flush operation is performed on the write buffer, separating the flush operation into first and second flush operations which do not overlap each other but are consecutive to each other, according to the check result, and performing the first and second flush operations, when the first write data grouped into a transaction and second write data, which are not grouped into a transaction, are mixed and stored in the write buffer according to the sequence of the write data received from the host. Among the write data stored in the write buffer, the controller may select and may store the first write data which are committed, in a first storage region of the nonvolatile memory device during the first flush operation, and may select and may store the first write data which are not completely committed and the second write data, in a second storage region of the nonvolatile memory device during the second flush operation.

The controller may receive a plurality of write commands corresponding to the respective write data from the host, each of the write commands may include transaction information of the corresponding write data, and the transaction information of each of the write data may include transaction identify (ID) information, commit information, and abort information.

The controller may check the transaction ID information of the transaction information of the respective write data, may sort the write data having no transaction ID information set therein into the second write data, and may sort the write data having the transaction ID information set to a specific value into the first write data.

The controller may perform the flush operation when a predetermined storage space of the write buffer is full, when it is checked that the set commit information is included in the transaction information of the respective first write data at the point of time that the flush operation is performed, the controller ay select and may store the first write data which are committed among the write data stored in the write buffer in the first storage region during the first flush operation, and may select and may store the first write data which are not completely committed and the second write data in the second storage region during the second flush operation.

When it is checked that the set commit information is not included in the transaction information of the respective first write data at the point of time that the flush operation is performed, the controller may select and may program the first write data which are not completely committed and the second write data, among the write data stored in the write buffer, to the nonvolatile memory device, during the flush operation.

When it is checked that the set abort information is included in the transaction information of the respective first write data at the point of time that the flush operation is performed, the controller may not program the aborted first write data of the write data stored in the write buffer to the nonvolatile memory device even during the flush operation.

The nonvolatile memory device may include a plurality of memory blocks, and each of the memory blocks comprises a plurality of pages, when each of the write data is set to a size corresponding to one or more pages, the controller may set one or more specific memory blocks to the first storage region, the one or more specific blocks being simultaneously or consecutively accessed for one read operation among the memory blocks, and may set one or more memory blocks of the other memory blocks excluding the specific memory block from the memory blocks to the second storage region.

The nonvolatile memory device may include a plurality of memory blocks, each of the memory blocks comprises a plurality of pages, and each of the pages comprises a plurality of sections, when each of the write data is set to a size corresponding to one or more sections, the controller may set one or more specific pages to the first storage region, the one or more specific pages being included in one or more specific memory blocks which are simultaneously or consecutively accessed for one read operation among the memory blocks, and may set one or more pages of the other pages excluding the specific page from the specific memory block to the second storage region.

When performing a merging operation for moving the valid first and second write data in the first and second storage regions to another storage region of the nonvolatile memory device after the first and second write data are stored in the first and second storage regions through the first and second flush operations, the controller may check whether the first write data stored in the first storage region are all valid and may change a method for performing the merging operation according to the check result.

When performing the merging operation after the first write data having the transaction ID information set to a first value and the first write data having the transaction ID information set to a second value are stored in the first storage region, the controller may move the first write data having the transaction ID information set to the first value to a third storage region of the nonvolatile memory device, and may move the valid data of the first write data having the transaction ID information set to the second value and the valid data of the second write data to a fourth storage region of the nonvolatile memory device, when the first write data having the transaction ID information set to the first value are all valid and only a part of the first write data having the transaction ID information set to the second value is valid.

In an embodiment, an operating method for a memory system which includes a nonvolatile memory device and a write buffer for temporarily storing a plurality of write data received from a host, the operating method may include: a first check step of checking whether first write data grouped into a transaction and second write data which are not grouped into a transaction are mixed and stored in the write buffer according to the sequence of the write data received from the host; a second check step of checking whether the first write data have been committed at a point of time that a flush operation is performed on the write buffer, when the result of the first check step indicates that the first and second write data are mixed and stored in the write buffer; and a separation and storage step of separating the flush operation for the write buffer into first and second flush operations which do not overlap each other but are consecutive to each other, selecting and storing the first write data which are committed, among the write data stored in the write buffer, in a first storage region of the nonvolatile memory device during the first flush operation, and selecting and storing the first write data which are not completely committed and the second write data among the write data stored in the write buffer, in a second storage region of the nonvolatile memory device during the second flush operation, when the result of the second check step indicates that the first write data have been committed.

The operating method may further include receiving a plurality of write commands corresponding to the respective write data from the host, each of the write commands may include transaction information of the corresponding write data, and the transaction information of the respective write data may include transaction identify (ID) information, commit information, and abort information.

The first check step may include: a first sorting step of checking the transaction ID information of the transaction information of the respective write data, and sorting the write data having no transaction ID information set therein into the second write data; a second sorting step of checking the transaction ID information of the transaction information of the respective write data, and sorting the write data having the transaction ID information set to a specific value into the first write data; and a third check step of checking whether the first and second write data are mixed and stored in the write buffer, after sorting the write data stored in the write buffer into the first and second write data through the first and second sorting steps.

The operating method may further include a flush operation step of performing the flush operation when a predetermined storage space of the write buffer is full, when the result of the third check step indicates that the first and second write data are mixed and stored in the write buffer, the second check step may include checking whether the set commit information is included in the transaction information of the respective first write data at the point of time that the flush operation step is performed.

The operating method may further include: performing the separation and storage step when it is checked at the second check step that the set commit information is included in the transaction information of the respective first write data, at the point of time that the flush operation step is started; and selecting the first write data which are not completely committed and the second write data among the write data stored in the write buffer and programming the selected data to the nonvolatile memory device during the flush operation, when it is checked at the second check step that the set commit information is not included in the transaction information of the respective first write data, at the point of time that the flush operation step is started.

The operating method may further include checking whether the set abort information is included in the transaction information of the respective first write data at the point of time that the flush operation step is performed, and not programming the aborted first write data of the write data stored in the write buffer to the nonvolatile memory device even during the flush operation, when the check result indicates that the abort information is included.

The nonvolatile memory device may include a plurality of memory blocks, and each of the memory blocks comprises a plurality of pages, the operating method may further include setting one or more specific memory blocks to the first storage region, the one or more specific memory blocks being simultaneously or consecutively accessed for one read operation among the memory blocks, and setting one or more memory blocks among the other memory blocks excluding the specific memory block from the memory blocks to the second storage region, when each of the write data is set to a size corresponding to one or more pages.

The nonvolatile memory device may include a plurality of memory blocks, each of the memory blocks comprises a plurality of pages, and each of the pages comprises a plurality of sections, the operating method may further include setting one or more specific pages to the first storage region, the one or more specific pages being included in one or more memory blocks which are simultaneously or consecutively accessed for one read operation among the memory blocks, and setting one or more pages among the other pages excluding the specific page from the specific memory block to the second storage region, when each of the write data is set to a size corresponding to one or more sections.

The operating method may further include, when a merging operation for moving the valid first and second write data in the first and second storage regions to another storage region of the nonvolatile memory device is performed after the first and second write data are stored in the first and second storage regions through the first and second flush operations at the separation and storage step, a fourth check step whether the first write data stored in the first storage region are all valid; and a merging operation step of changing a method for performing the merging operation according to the result of the fourth check step.

When the merging operation is performed after the first write data having the transaction ID information set to a first value and the first write data having the transaction ID information set to a second value are stored in the first storage region at the second sorting step, the merging operation step may include moving the first write data having the transaction ID information set to the first value to a third storage region of the nonvolatile memory device, and then moving valid data of the first write data having the transaction ID information set to the second value and valid data of the second write data to a fourth storage region of the nonvolatile memory device, when it is checked at the fourth check step that the first write data having the transaction ID information set to the first value are all valid and only a part of the first write data having the transaction ID information set to the second value is valid.

In an embodiment, a memory system may include: a memory device including a first storage region and a second storage region; and a controller including a write buffer, the controller suitable for: receiving and storing a plurality of write data, which includes a plurality of transaction data and at least one normal data, in the write buffer; when the write buffer is full, determining whether each of the plurality of transaction data is transaction commit data or transaction abort data; flushing the transaction commit data in the first storage region of the memory device; and flushing the transaction abort data and the normal data in the second storage region of the memory device.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
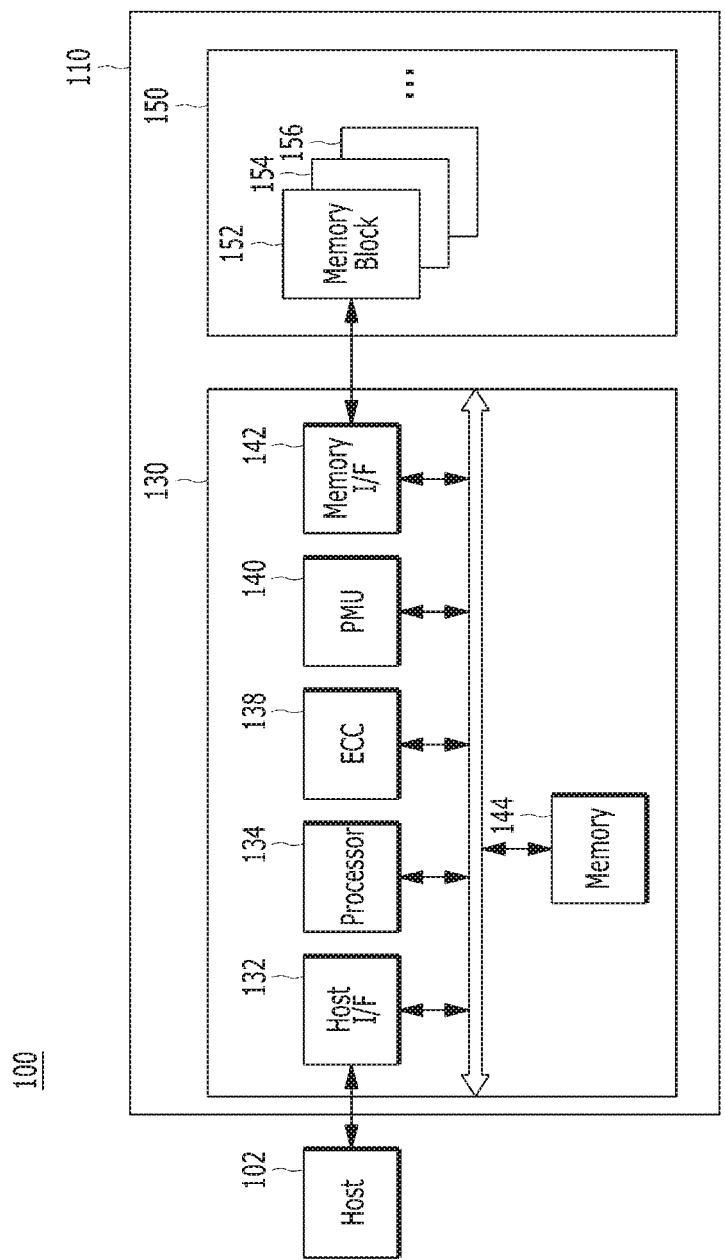
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, television (TV) and projector.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limited examples of storage devices included in the memory system 110 may include volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a controller 130 and a memory device 150. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game machine, a navigation system, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a radio frequency identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program, and erase operations of the memory device 150.

The controller 130 may include a host interface (I/F) unit 132, a processor 134, an error correction code (ECC) unit 138, a power management unit (PMU) 140, a memory interface (I/F) (or a NAND flash controller (NFC)) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as low density parity check (LDPC) code, Bose-Chaudhri-Hocquenghem (BCH) code, turbo code, Reed-Solomon (RS) code, convolution code, recursive systematic code (RSC), trellis-coded modulation (TCM) and block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory or storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program, and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by a static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
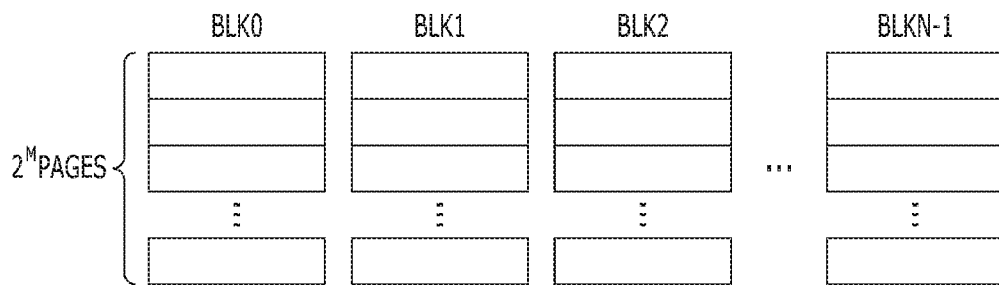
FIG. 2 is a diagram illustrating a memory device employed in the memory system shown in FIG. 1.

FIG. 2 is a diagram illustrating the memory device 150 of the memory system 110 in FIG. 1.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1 bit of data, or a multi-level cell (MLC) storing 2 or more bits of data. In an embodiment, the memory device 150 may include a plurality of triple level cells (TLC) each storing 3 bits of data. In another embodiment, the memory device 150 may include a plurality of quadruple level cells (QLC) each storing 4 bits of data.

Figure 3:
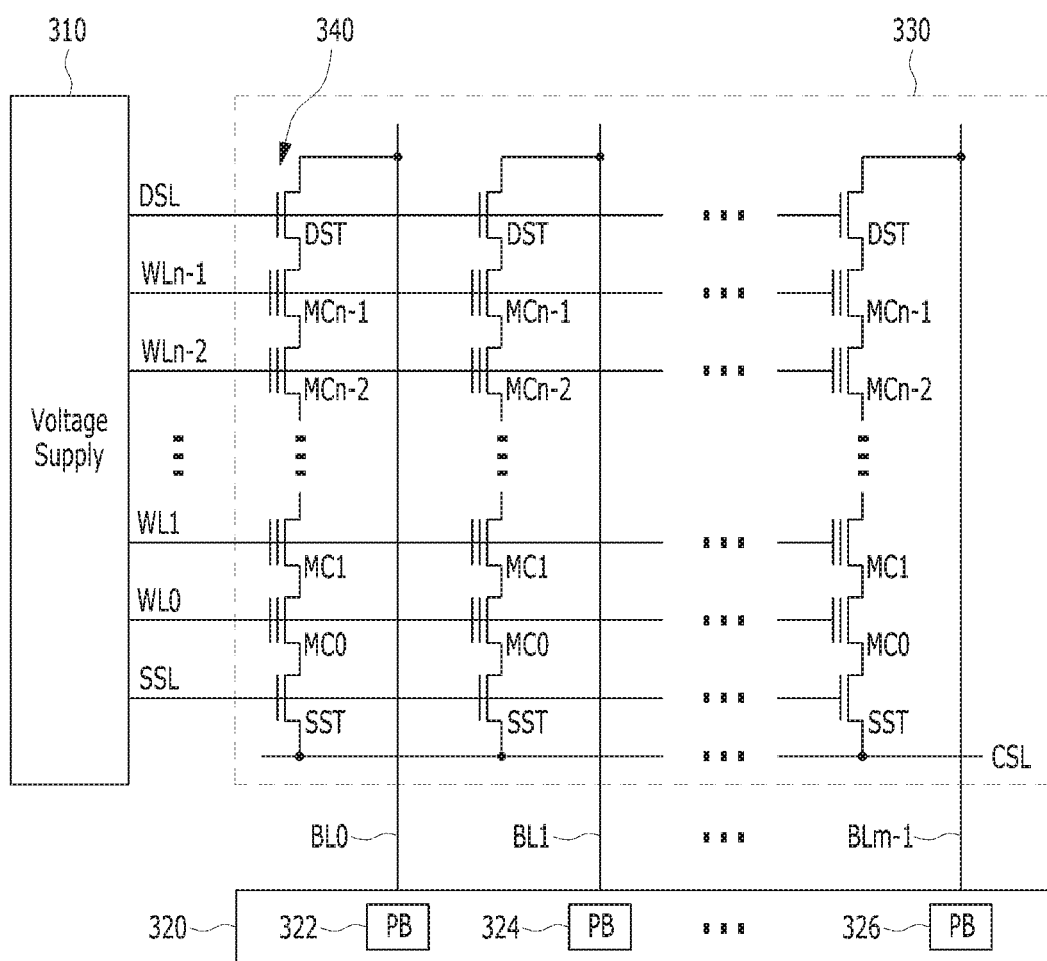
FIG. 3 is a circuit diagram illustrating a memory cell array of a memory block in the memory device shown in FIG. 2.

FIG. 3 is a circuit diagram illustrating a memory cell array of a memory block 330 in the memory device 150.

Referring to FIG. 3, the memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. In the cell strings 340, each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode.

The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive, from a buffer (not illustrated) data to be stored into the memory cell array, and drive bit lines according to the received data. The read/write circuit 320 may include a plurality of page buffers (PBs) 322 to 326 respectively corresponding to columns (or bit lines) or column pairs (or bit line pairs). Each of the page buffers 322 to 326 may include a plurality of latches (not illustrated).

Figure 4:
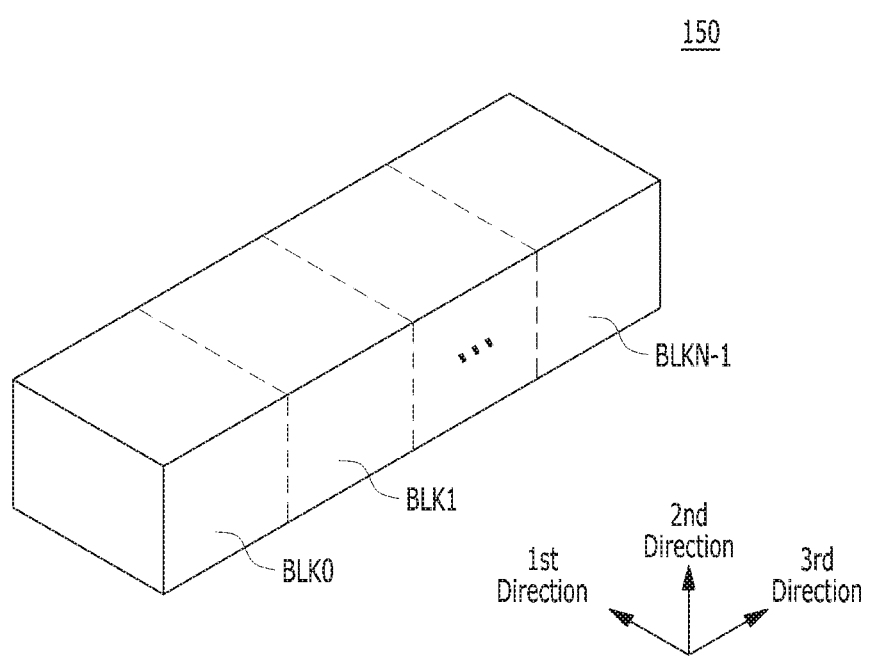
FIG. 4 is a diagram illustrating a three-dimensional structure of the memory device shown in FIG. 2.

FIG. 4 is a diagram illustrating a three-dimensional (3D) structure of the memory device 150 in FIG. 2.

The memory device 150 may be embodied by a two-dimensional (2D) or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

FIGS. 5 and 6A to 6D are diagrams illustrating an operation of storing a plurality of write data grouped into a transaction in a nonvolatile memory device in a memory system in accordance with an embodiment.

Figure 5:
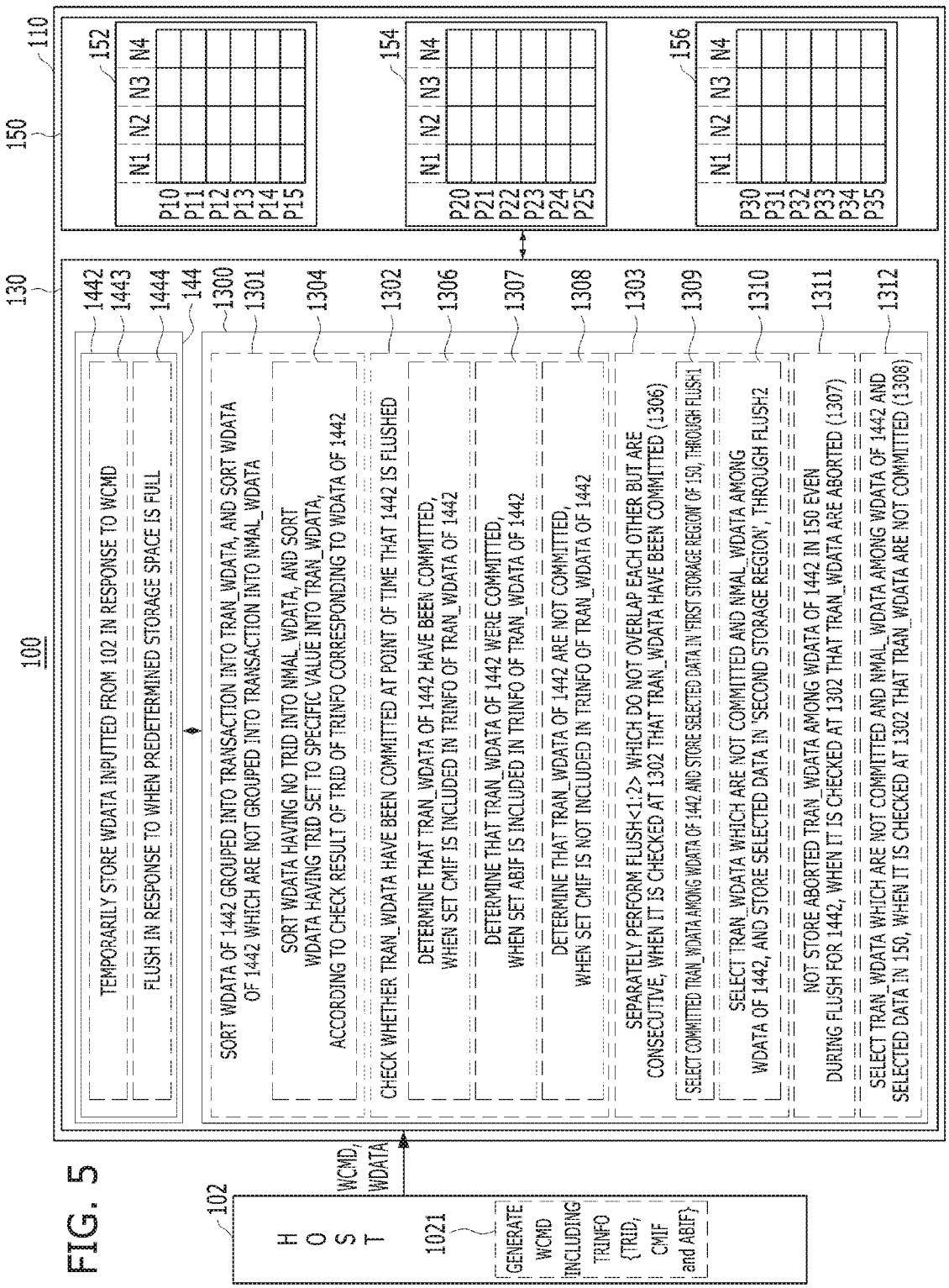
FIGS. 5 and 6A to 6D are diagrams illustrating an operation of storing a plurality of write data grouped into a transaction in a nonvolatile memory device in a memory system in accordance with an embodiment.

FIG. 5 illustrates a data processing system 100 including a host 102 and a memory system 110, with reference to the configuration of the data processing system 100 illustrated in FIG. 1.

Referring to FIG. 5, as described with reference to FIG. 1, the memory system 110 may include the controller 130 and the memory device 150.

Furthermore, as described with reference to FIG. 1, the memory device 150 may include the plurality of memory blocks 152, 154 and 156. The memory blocks 152, 154 and 156 may include a plurality of pages P<10, 11, 12, 13, 14, 15>, P<20, 21, 22, 23, 24, 25> and P<30, 31, 32, 33, 34, 35>, respectively.

For reference, FIG. 5 illustrates that the memory system 110 includes only one nonvolatile memory device 150. However, this configuration is only an example for convenience of description, and a larger number of nonvolatile memory devices may be included in the memory system 110. FIG. 5 illustrates a configuration in which the nonvolatile memory device 150 includes three memory blocks 152, 154 and 156. However, this is only an example for convenience, and a larger or smaller number of memory blocks may be included in the nonvolatile memory device 150. Furthermore, FIG. 5 illustrates that the memory blocks 152, 154 and 156 includes six pages P<10, 11, 12, 13, 14, 15>, P<20, 21, 22, 23, 24, 25> and P<30, 31, 32, 33, 34, 35>, respectively. However, this is only an example for convenience, and a larger or smaller number of pages may be included in each of the memory blocks 152, 154 and 156.

FIG. 1 illustrates that the host interface 132, the processor 134, the ECC unit 138, the power management unit 140 and the NAND flash controller 142 are included in the controller 130, and FIG. 5 illustrates that the respective units are not included in the controller 130. However, the units are only omitted for convenience, and may be included in the controller 130.

The memory system 110 described below may perform an operation of processing write data WDATA grouped into transactions.

In various embodiments, grouping the write data WDATA into transactions may indicate that a plurality of write data WDATA used for the same purpose among the write data WDATA are grouped into one transaction.

For example, data used for correcting, adding and updating data stored in a data base may be grouped into transactions according to the respective usages. At this time, the data used for correcting the data base may be set to one transaction group, and the data used for adding to the data base may be set to another transaction group.

Therefore, when the write data WDATA grouped into one transaction is transmitted to the memory system 110 from the host 102, the write data WDATA may have only a commit state or abort state. When the write data WDATA have the commit state, it may indicate that all of the write data WDATA are valid because all of the write data WDATA have been normally transmitted and stored. On the other hand, when the write data WDATA have the abort state, it may indicate that any one of the write data WDATA has not been normally transmitted and stored, or all of the write data WDATA are invalid according to an abort request of the host 102. That is, the write data WDATA grouped into one transaction may have significance only when the write data WDATA have the commit state in which all of the write data WDATA are valid because all of the write data WDATA have been normally transmitted and stored.

For example, the first write data TRAN_WDATA grouped into a transaction among the write data WDATA transmitted to the memory system 110 from the host 102 may be determined to have the commit state in the memory system 110, only when all of the plurality of first write data TRAN_WDATA are normally transmitted and stored into the memory system 110 from the host 102 and no abort requests are provided from the host 102. If any one of the first write data TRAN_WDATA is not normally transmitted and stored or an abort request is provided from the host 102, all of the first write data TRAN_WDATA may be determined to have the abort state in the memory system 110.

The above-described operation of managing the first write data TRAN_WDATA grouped in one transaction by distinguishing the first write data TRAN_WDATA into the commit state or the abort state may be generally referred to as an operation for guaranteeing an atomic transaction.

Referring again to FIG. 5, the controller 130 may include the nonvolatile memory device 150, a volatile memory device 144 and a transaction manager 1300.

The nonvolatile memory device 150 may include the plurality of memory blocks 152, 154 and 156. The memory blocks 152, 154 and 156 may include the plurality of pages P<10, 11, 12, 13, 14, 15>, P<20, 21, 22, 23, 24, 25> and P<30, 31, 32, 33, 34, 35>, respectively. Each of the pages may include a plurality of sections N<1:4>.

The volatile memory device 144 may include a write buffer 1442. At operation 1443, the write buffer 1442 may temporarily store the plurality of write data WDATA inputted from the host 102.

At operation 1443, the controller 130 may perform a flush operation on the write buffer 1442, in response to when a predetermined storage space of the write buffer 1442 is full. For example, the controller 130 may flush the write buffer 1442 in response to when all of the storage space assigned as the write buffer 1442 in the volatile memory device 144 is full.

At operation 1301, the transaction manager 1300 may sort the write data WDATA into the first write data TRAN_WDATA grouped into a transaction and second write data NMAL_WDATA which are not grouped into a transaction. The write data WDATA may be inputted from the host 120 and stored in the write buffer 1442. That is, after the write data WDATA are inputted from the host 120 and stored in the write buffer 1442, the transaction manager 1300 may sort the write data WDATA into the first write data TRAN_WDATA grouped into a transaction and the second write data NMAL_WDATA which are not grouped into a transaction before the write data WDATA are stored in the nonvolatile memory device 150.

The write data WDATA stored in the write buffer 1442 may be sequentially stored according to the sequence of the write data WDATA inputted from the host 102. Therefore, the write data WDATA grouped into a transaction, i.e. the first write data TRAN_WDATA and the write data WDATA which are not grouped into a transaction, i.e. the second write data NMAL_WDATA may be mixed and stored in the write buffer 1442 according to only the sequence of the write data WDATA inputted from the host 102.

Therefore, the transaction manager 1300 may sort the write data WDATA, which are mixed and stored in the write buffer 1442 according to the sequence of the write data WDATA inputted from the host 102, into the first write data TRAN_WDATA grouped into a transaction and the second write data NMAL_WDATA which are not grouped into a transaction, depending on whether the write data WDATA are grouped into a transaction.

More specifically, operation 1301 will be described as follows.

When the write data WDATA are inputted from the host 102, write commands WCMD corresponding to the respective write data WDATA may be inputted together.

The write commands WCMD may include transaction information TRINFO of the write data WDATA corresponding to the respective write commands WCMD.

The transaction information TRINFO of the write data WDATA may include transaction identify (ID) information TRID, transaction commit information CMIF and transaction abort information ABIF.

At operation 1021, the write commands WCMD, which include the transaction information TRINFO including the transaction ID information TRID, the transaction commit information CMIF and the transaction abort information ABIF, may be generated by the host 102. The write commands WCMD may be inputted to the controller 130 of the memory system 110 with the write data WDATA.

Therefore, the controller 130 of the memory system 110 may store the write data WDATA in the write buffer 1442 in response to the write commands WCMD. Then, the controller 130 may store the write data WDATA stored in the write buffer 1442 into the nonvolatile memory device 150 by performing a flush operation on the write buffer 1442 in response to when the predetermined storage space of the write buffer 1442 is full.

At operation 1304, the transaction manager 1300 included in the controller 130 may check the transaction ID information TRID of the transaction information TRINFO included in the write commands WCMD. Further, the transaction manager 1300 may sort the write data WDATA stored in the write buffer 1442 into the first write data TRAN_WDATA grouped into a transaction and the second write data NMAL_WDATA which are not grouped into a transaction.

That is, the transaction manager 1300 may check the transaction ID information TRID of the transaction information TRINFO of the write data WDATA stored in the write buffer 1442. When the write data WDATA has the transaction ID information TRID set to a specific value, the transaction manager 1300 may sort the write data WDATA into the first write data TRAN_WDATA.

When the write data WDATA has no transaction ID information TRID set therein, the transaction manager 1300 may check the transaction ID information TRID of the transaction information TRINFO of the write data WDATA stored in the write buffer 1442, and sort the write data WDATA into the second write data NMAL_WDATA.

For example, the write data WDATA of which the transaction ID information TRID has a first value, among the write data WDATA stored in the write buffer 1442, are the first write data TRAN_WDATA grouped into a first transaction.

Similarly, the write data WDATA of which the transaction ID information TRID has a second value, among the write data WDATA stored in the write buffer 1442, are the first write data TRAN_WDATA grouped into a second transaction.

On the other hand, the write data WDATA of which the transaction ID information TRID is not set to any value, among the write data WDATA stored in the write buffer 1442, are the second write data NMAL_WDATA which are not grouped into a transaction.

When the transaction ID information TRID is not set to any value, it may indicate that the transaction ID information TRID is set to a predefined initial value or a value which is not significant, as the transaction ID information.

At operation 1302, the transaction manager 1300 may check whether the first write data TRAN_WDATA stored in the write buffer 1442 have been committed at the point of time that the write buffer 1442 is flushed.

At this time, the first write data TRAN_WDATA sorted as data grouped into a transaction among the write data WDATA stored in the write buffer 1442 through operation 1301 need to be written to the memory blocks 152, 154 and 156 in a different manner depending on whether the first write data TRAN_WDATA have been committed, due to the characteristic of the data grouped into a transaction.

For this reason, the transaction manager 1300 may first check whether the first write data TRAN_WDATA stored in the write buffer 1442 have been committed, at the point of time that the write buffer 1442 is flushed.

For example, when the set commit information CMIF is included in the transaction information TRINFO of the first write data TRAN_WDATA grouped into the first transaction and stored in the write buffer 1442, at operation 1306, it may determine that the first write data TRAN_WDATA grouped into the first transaction have been completely committed.

When the set commit information CMIF is not included in the transaction information TRINFO of the first write data TRAN_WDATA grouped into the second transaction and stored in the write buffer 1442, at operation 1308, it may determine that the first write data TRAN_WDATA grouped into the second transaction are not completely committed.

When the set abort information ABIF is included in the transaction information TRINFO of the first write data TRAN_WDATA grouped into a third transaction and stored in the write buffer 1442, at operation 1307, it may determine that the first write data TRAN_WDATA grouped into the third transaction were aborted.

In various embodiments, each of the first write data TRAN_WDATA grouped into the first transaction may be in a state in which the transaction ID information TRID of the transaction information TRINFO has the first value. Furthermore, each of the first write data TRAN_WDATA grouped into the second transaction may be in a state in which the transaction ID information TRID of the transaction information TRINFO has the second value. Furthermore, each of the first write data TRAN_WDATA grouped into the third transaction may be in a state in which the transaction ID information TRID of the transaction information TRINFO has a third value.

As such, the first write data TRAN_WDATA stored in the write buffer 1442 may be distinguished into different transaction groups, depending on to which value the transaction ID information TRID of the transaction information TRINFO is specified.

That is, the first write data TRAN_WDATA stored in the write buffer 1442 may include a plurality of transaction groups mixed therein. Among the plurality of transaction groups, a transaction may have been completely committed, another transaction may not be completely committed, and another transaction might be aborted.

Through operation 1302, the transaction manager 1300 may check whether the first write data TRAN_WDATA stored in the write buffer 1442 have been committed. Then, the transaction manager 1300 may just perform a flush operation on the write buffer 1442, or separately perform first and second flush operations FLUSH1 and FLUSH2 which do not overlap each other but are consecutive to each other, according to the check result.

Specifically, when the result of operation 1302 indicates that the committed first write data TRAN_WDATA are included in the first write data TRAN_WDATA (operation 1306), the transaction manager 1300 may separately perform the first and second flush operations FLUSH1 and FLUSH2 which do not overlap each other but are consecutive to each other, as the flush operation for the write buffer 1442. In other words, when it is checked that the set commit information CMIF is included in the transaction information TRINFO of the respective first write data TRAN_WDATA, the transaction manager 1300 may separately perform the first and second flush operations FLUSH1 and FLUSH2.

The first flush operation FLUSH1 may indicate operation 1309, which includes selecting the committed first write data TRAN_WDATA among the first write data TRAN_WDATA stored in the write buffer 1442 and storing the selected data in a 'first storage region' of the nonvolatile memory device 150.

The second flush operation FLUSH2 may indicate operation 1310, which includes selecting the first write data TRAN_WDATA which are not completely committed, among the first write data TRAN_WDATA stored in the write buffer 1442, and the second write data NMAL_WDATA, then storing the selected data in a 'second storage region' of the nonvolatile memory device 150.

That is, at operation 1309, when the result of operation 1302 indicates that the committed first write data TRAN_WDATA are included in the first write data TRAN_WDATA stored in the write buffer 1442, the transaction manager 1300 may select only the committed first write data TRAN_WDATA through the first flush operation FLUSH1, and store the selected data in the 'first storage region' of the nonvolatile memory device 150. After the first flush operation FLUSH1, at operation 1310, the transaction manager 1300 may select the first write data TRAN_WDATA which are not completely committed and the second write data NMAL_WDATA, and store the selected data in the 'second storage region' of the nonvolatile memory device 150, through the second flush operation FLUSH2.

Therefore, when the committed first write data TRAN_WDATA are included in the first write data TRAN_WDATA stored in the write buffer 1442 (operation 1306), the transaction manager 1300 may select only the committed first write data TRAN_WDATA and store the selected data in the 'first storage region' of the nonvolatile memory device 150. Furthermore, the transaction manager 1300 may select the first write data TRAN_WDATA which are not completed and the second write data, then store the selected data in the 'second storage region' of the nonvolatile memory device 150.

For example, the first write data TRAN_WDATA grouped into the first transaction, the first write data TRAN_WDATA grouped into the second transaction, and the second write data NMAL_WDATA are stored in the write buffer 1442. Furthermore, the set commit information CMIF is included in the transaction information TRINFO of the respective first write data TRAN_WDATA grouped into the first transaction. Further, the set commit information CMIF and the set abort information ABIF are not included in the transaction information TRINFO of the respective first write data TRAN_WDATA grouped into the second transaction.

In this case, through operation 1302, the transaction manager 1300 may check that the first write data TRAN_WDATA grouped into the first transaction and stored in the write buffer 1442 have been completely committed, and the first write data TRAN_WDATA grouped into the second transaction are not completely committed.

Therefore, through operation 1309, the transaction manager 1300 may store the first write data TRAN_WDATA grouped into the first transaction in the 'first storage region' of the nonvolatile memory device 150 by performing the first flush operation FLUSH1. Then, through operation 1310, the transaction manager 1300 may store the first write data TRAN_WDATA grouped into the second transaction and the second write data NMAL_WDATA in the 'second storage region' of the nonvolatile memory device 150.

When the result of operation 1302 indicates that the committed first write data TRAN_WDATA are not included in the first write data TRAN_WDATA (operation 1308), the transaction manager 1300 may just perform a flush operation on the write buffer 1442. In other words, when the set commit information CMIF is not included in the transaction information TRINFO of the respective first write data TRAN_WDATA even though the transaction information TRINFO was all checked, the transaction manager 1300 may just perform a flush operation on the write buffer 1442. Specifically, at operation 1312, the transaction manager 1300 may select the first write data TRAN_WDATA which are not completely committed, among the write data WDATA stored in the write buffer 1442, and the second write data NMAL_WDATA then store the selected data in the nonvolatile memory device 150.

For example, the first write data TRAN_WDATA grouped into the first transaction, the first write data TRAN_WDATA grouped into the second transaction, and the second write data NMAL_WDATA are stored in the write buffer 1442. Furthermore, the set commit information CMIF and the set abort information ABIF are neither included in the transaction information TRINFO of the respective first write data TRAN_WDATA grouped into the first transaction, nor included in the transaction information TRINFO of the respective first write data TRAN_WDATA grouped into the second transaction.

In this case, through operation 1302, the transaction manager 1300 may check that the first write data TRAN_WDATA grouped into the first transaction and stored in the write buffer 1442 are not completely committed, and the first write data TRAN_WDATA grouped into the second transaction are not completely committed.

Therefore, the transaction manager 1300 may store the first write data TRAN_WDATA grouped into the first transaction, the first write data TRAN_WDATA grouped into the second transaction, and the second write data NMAL_WDATA in the nonvolatile memory device 150 by performing the flush operation through operation 1312.

When the result of operation 1302 indicates that the set abort information ABIF is included in the transaction information TRINFO of the respective first write data TRAN_WDATA (operation 1307), at operation 1311, the transaction manager 1300 may just perform a flush operation on the write buffer 1442, but not program the aborted first write data TRAN_WDATA of the write data WDATA stored in the write buffer 1442 to the nonvolatile memory device 150 even during the flush operation.

For example, the first write data TRAN_WDATA grouped into the first transaction, the first write data TRAN_WDATA grouped into the second transaction, and the second write data NMAL_WDATA are stored in the write buffer 1442. Furthermore, the set commit information CMTF and the set abort information ABIF are not included in the transaction information TRINFO of the respective first write data TRAN_WDATA grouped into the first transaction, and the set abort information ABIF is included in the transaction information TRINFO of the respective first write data TRAN_WDATA grouped into the second transaction.

In this case, through operation 1302, the transaction manager 1300 may check that the first write data TRAN_WDATA grouped into the first transaction and stored in the write buffer 1442 are not completely committed, and the first write data TRAN_WDATA grouped into the second transaction are aborted.

Therefore, the transaction manager 1300 may perform the flush operation through operation 1311, but not store the first write data TRAN_WDATA grouped into the second transaction in the nonvolatile memory device 150 even during the flush operation. That is, during the flush operation, the transaction manager 1300 may select only the first write data TRAN_WDATA grouped into the first transaction and the second write data NMAL_WDATA and store the selected data in the nonvolatile memory device 150.

FIGS. 6A to 6D show that the committed first write data TRAN_WDATA of '0, 1, 2 and 3' and the second write data NMAL_WDATA of 'A, B, C and D' are mixed and stored in the write buffer 1442.

Figure 6A:
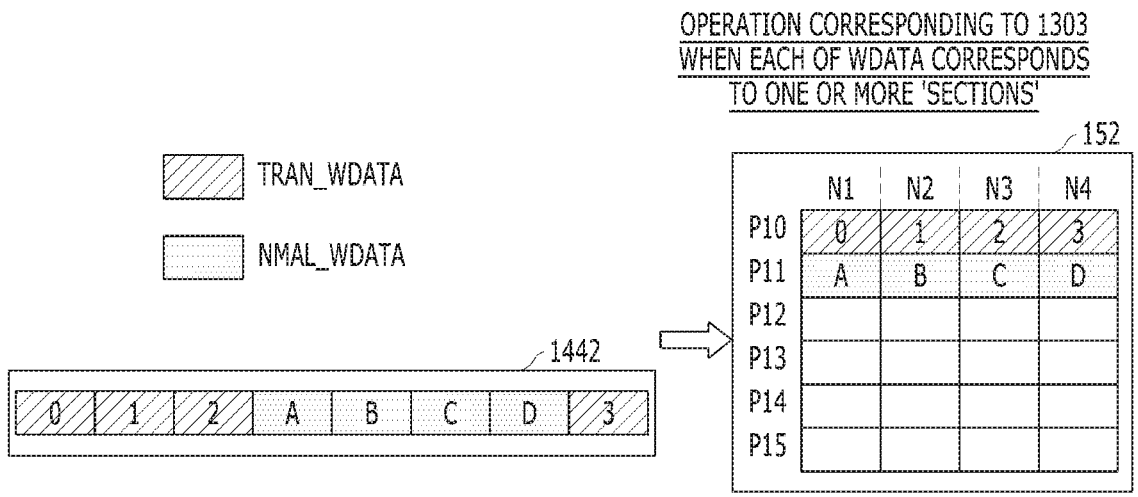
Figure 6B:
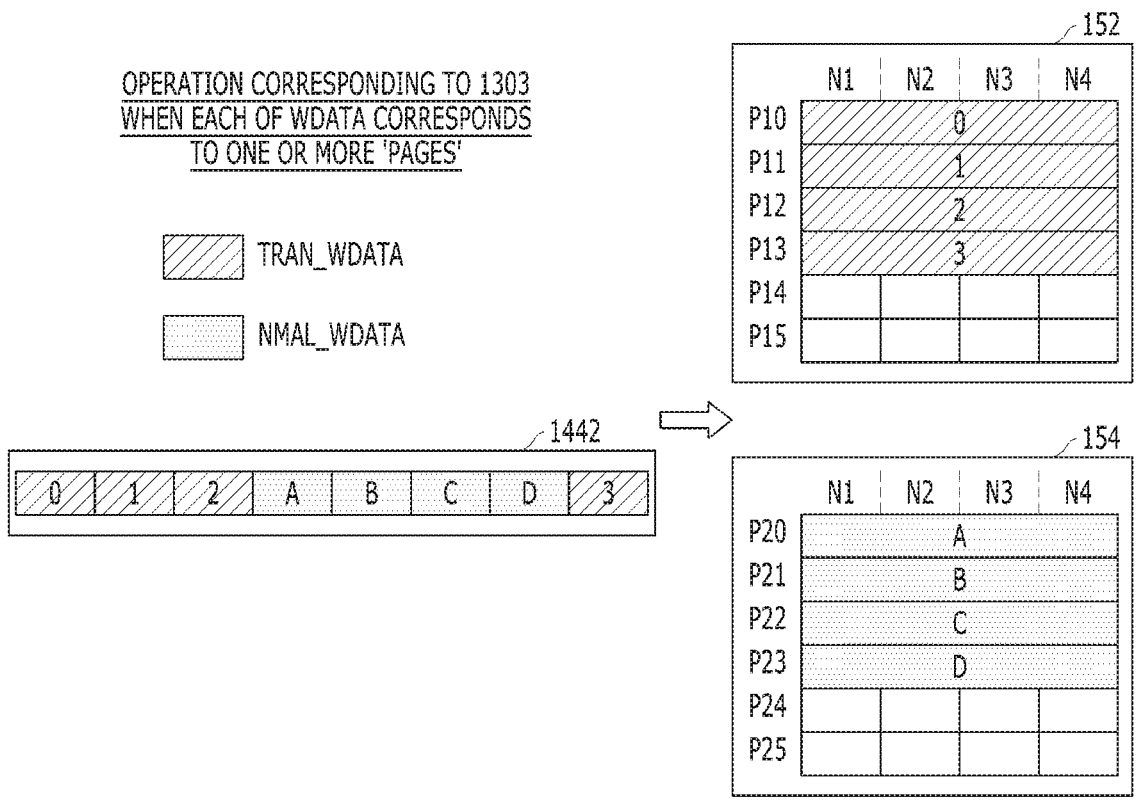

Furthermore, FIGS. 6A and 6B show that the transaction manager 1300 stores the first write data TRAN_WDATA of '0, 1, 2 and 3' in the 'first storage region' of the nonvolatile memory device 150 during the first flush operation FLUSH1, and stores the second write data NMAL_WDATA of 'A, B, C and D' in the 'second storage region' of the nonvolatile memory device 150 during the second flush operation FLUSH2, through operation 1303 of FIG. 5. That is, the set commit information CMIF may be included in the transaction information TRINFO corresponding to the first write data TRAN_WDATA of '0, 1, 2 and 3'. Thus, the transaction manager 1300 may perform operation 1303.

FIG. 6A shows how the 'first and second storage regions' of the nonvolatile memory device 150 used at operation 1303 are set, when each of the write data WDATA stored in the write buffer 1442 is set to a size corresponding to one or more 'sections'.

FIG. 6B shows how the 'first and second storage regions' of the nonvolatile memory device 150 used at operation 1303 are set, when each of the write data WDATA stored in the write buffer 1442 is set to a size corresponding to one or more 'pages'.

As described above with reference to FIG. 5, the nonvolatile memory device 150 may include the plurality of memory blocks 152, 154 and 156. The memory blocks 152, 154 and 156 may include the plurality of pages P<10, 11, 12, 13, 14, 15>, P<20, 21, 22, 23, 24, 25> and P<30, 31, 32, 33, 34, 35>, respectively. Each of the pages P<10, 11, 12, 13, 14, 15>, P<20, 21, 22, 23, 24, 25> and P<30, 31, 32, 33, 34, 35> may include the plurality of sections N<1:4>.

FIG. 6A illustrates that each of the write data WDATA stored in the write buffer 1442 is set to a size corresponding to one or more 'sections'. As such, each of the write data WDATA stored in the write buffer 1442 may be set to a size corresponding to one or more sections less than the unit page.

Therefore, the controller 130 may set one or more 'specific pages' to the 'first storage region'. The one or more specific pages may be included in one or more 'specific memory blocks' which are simultaneously or consecutively accessed for one read operation among the memory blocks 152, 154 and 156. Furthermore, the controller 130 may set one or more pages to the 'second storage region'. The one or more pages may be included in the other pages excluding the 'specific page' set to the 'first storage region' in the 'specific memory block'.

At this time, the one or more 'specific memory blocks' may indicate one or more memory blocks which can be simultaneously or consecutively accessed for one read operation. That is, the one or more 'specific memory blocks' may indicate one memory block selected for one read operation, indicate that two or more memory blocks which are simultaneously or consecutively selected for one read operation are grouped into a super block, or indicate two or more memory blocks which can be consecutively accessed through an interleaving method for one read operation.

For example, each of '0, 1, 2, A, B, C, D and 3' which are a total of eight write data WDATA stored in the write buffer 1442 has a size corresponding to one section. Therefore, the write buffer 1442 has a size corresponding to a total of eight sections. In this case, the write buffer 1442 may have a size corresponding to a total of two pages since that one page includes four sections.

Therefore, the controller 130 may set the first memory block 152 of the memory blocks 152, 154 and 156 to the 'specific memory block'. Furthermore, the controller 130 may set the first page P10 of the first memory block 152 set to the 'specific memory block' to the 'first storage region'. Furthermore, the controller 130 may set any one page P11 of the other pages P<11, 12, 13, 14, 15> to the 'second storage region', the other pages P<11, 12, 13, 14, 15> excluding the first page P10 set to the 'first storage region' in the first memory block 152 set to the 'specific memory block'.

In this state, the transaction manager 1300 included in the controller 130 may perform operation 1303. The operation 1303 may include selecting '0, 1, 2 and 3' corresponding to the first write data TRAN_WDATA grouped into a transaction among the eight write data WDATA of '0, 1, 2, A, B, C, D and 3' stored in the write buffer 1442. Also, the operation 1303 may include storing the selected data in four sections included in the first page P10 of the first memory block 152 through the first flush operation FLUSH1. Further, the operation 1303 may include selecting the second write data NMAL_WDATA of 'A, B, C and D', and storing the selected data in four sections included in the second page P11 of the first memory block 152 through the second flush operation FLUSH2.

In short, the first write data TRAN_WDATA grouped into a transaction and the second write data NMAL_WDATA which are not grouped into a transaction may be mixed and stored in the write buffer 1442 according to the sequence of the write data inputted from the host 102. However, the transaction manager 1300 may separately perform the first and second flush operations FLUSH1 and FLUSH2 as the flush operation for the write buffer 1442 through operation 1303. Therefore, the first storage space where the first write data TRAN_WDATA grouped into a transaction are stored, i.e. the first page P10 of the first memory block 152 and the second storage space where the second write data NMAL_WDATA which are not grouped into a transaction are stored, i.e. the second page P11 of the first memory block 152 may be physically separated from each other in the nonvolatile memory device 150.

FIG. 66 illustrates that each of the write data WDATA stored in the write buffer 1442 is set to a size corresponding to one or more 'pages'. As such, each of the write data WDATA stored in the write buffer 1442 may be set to a size corresponding to one or more pages less than the unit memory block.

Therefore, the controller 130 may set one or more 'specific memory blocks' to the 'first storage region'. The one or more 'specific memory blocks' may be simultaneously or consecutively accessed for one read operation among the memory blocks 152, 154 and 156. Furthermore, the controller 130 may set one or more memory blocks to the 'second storage region'. The one or more memory blocks may be included in the other memory blocks excluding the 'specific memory block' set to the 'first storage region' among the memory blocks 152, 154 and 156.

At this time, the one or more 'specific memory blocks' may indicate one or more memory blocks which can be simultaneously or consecutively accessed for one read operation. That is, the one or more 'specific memory blocks' may indicate one memory block selected for one read operation, indicate that two or more memory blocks which are simultaneously or consecutively selected for one read operation are grouped into a super block, or indicate two or more memory blocks which can be consecutively accessed through an interleaving method for one read operation.

For example, each of '0, 1, 2, A, B, C, D and 3' which are a total of eight write data WDATA stored in the write buffer 1442 has a size corresponding to one page. Therefore, the write buffer 1442 has a size corresponding to a total of eight pages.

Therefore, the controller 130 may select the first memory block 152 of the memory blocks 152, 154 and 156 as the 'specific memory block', and set the selected memory block to the 'first storage region'. Furthermore, the controller 130 may set any one memory block 154 to the 'second storage region'. Among the memory blocks 152, 154 and 156, the memory block 154 may be included in the other memory blocks 154 and 156 excluding the first memory block 152 which is selected as the 'specific memory block' and set to the 'first storage region'.

In this state, the transaction manager 1300 included in the controller 130 may perform operation 1303. The operation 1303 may include selecting '0, 1, 2 and 3' corresponding to the first write data TRAN_WDATA grouped into a transaction among the eight write data WDATA of '0, 1, 2, A, B, C, D and 3' stored in the write buffer 1442, and storing the selected data in four pages P<10, 11, 12, 13> included in the first memory block 152 through the first flush operation FLUSH1. Further, the operation 1303 may include selecting the second write data NMAL_WDATA of 'A, B, C and D', and storing the selected data in four pages P<20, 21, 22, 23> included in the second memory block 154 through the second flush operation FLUSH2.

In short, the first write data TRAN_WDATA grouped into a transaction and the second write data NMAL_WDATA which are not grouped into a transaction may be mixed and stored in the write buffer 1442 according to the sequence of the write data inputted from the host 102. However, the transaction manager 1300 may separately perform the first and second flush operations FLUSH1 and FLUSH2 as the flush operation for the write buffer 1442 through operation 1303. Therefore, the first storage space where the first write data TRAN_WDATA grouped into a transaction are stored, i.e. the first memory block 152, and the second storage space where the second write data NMAL_WDATA which are not grouped into a transaction are stored, i.e. the second memory block 154, may be physically separated from each other in the nonvolatile memory device 150.

Figure 6C:
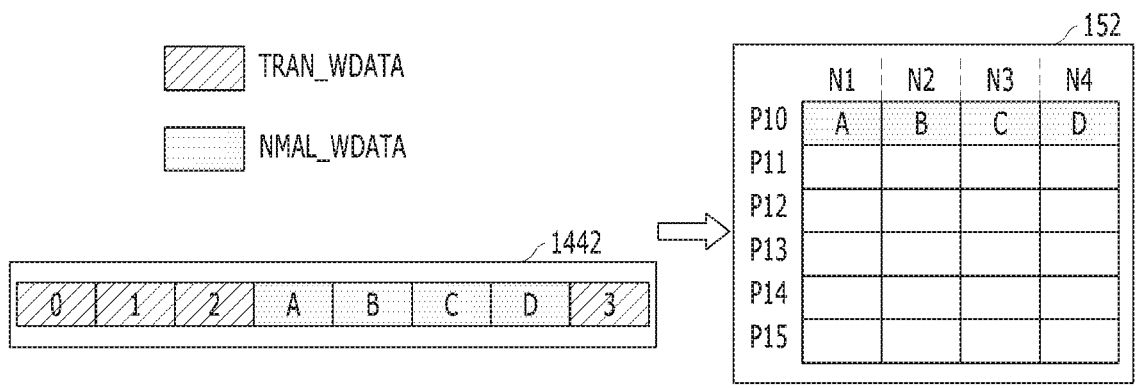

FIG. 6C shows that the transaction manager 1300 does not store the first write data TRAN_WDATA of '0, 1, 2, 3' in the nonvolatile memory device 150, but selects only the second write data NMAL_WDATA of 'A, B, C and D' then stores the selected data in the nonvolatile memory device 150 during the flush operation, through operation 1311 of FIG. 5. That is, the set abort information ABIF may be included in the transaction information TRINFO corresponding to the first write data TRAN_WDATA of '0, 1, 2 and 3'. Thus, the transaction manager 1300 may perform operation 1311.

Specifically, FIG. 6C illustrates that each of the write data WDATA stored in the write buffer 1442 is set to a size corresponding to one or more 'sections', similar to FIG. 6A. That is, each of the write data WDATA stored in the write buffer 1442 may be set to a size corresponding to one or more sections less than the unit page.

Therefore, at operation 1311 of FIG. 5, the controller 130 may set one or more 'specific memory blocks' which are simultaneously or consecutively accessed for one read operation among the memory blocks 152, 154 and 156, then use the set one or more memory blocks as a space for storing the second write data NMAL_WDATA selected.

For example, each of '0, 1, 2, A, B, C, D and 3' which are a total of eight write data WDATA stored in the write buffer 1442 has a size corresponding to one section. Therefore, the write buffer 1442 has a size corresponding to a total of eight sections. In this case, the write buffer 1442 may have a size corresponding to a total of two pages since one page includes four sections.

Therefore, the controller 130 may set the first memory block 152 of the memory blocks 152, 154 and 156 to the 'specific memory block'. In this state, the transaction manager 1300 included in the controller 130 may select the second write data NMAL_WDATA of 'A, B, C and D' which are not grouped into a transaction, among the eight write data WDATA of '0, 1, 2, A, B, C, D and 3' stored in the write buffer 1442, then store the selected data in four sections included in the first page P10 of the first memory block 152 set to the 'specific memory block' through the flush operation. At this time, the first write data TRAN_WDATA of '0, 1, 2 and 3' grouped into a transaction among the eight write data WDATA of '0, 1, 2, A, B, C, D and 3' stored in the write buffer 1442 may not be stored in the first memory block 152 set to the 'specific memory block', because the set abort information ABIF is included in the transaction information TRINFO corresponding to the first write data TRAN_WDATA of '0, 1, 2 and 3'.

Figure 6D:
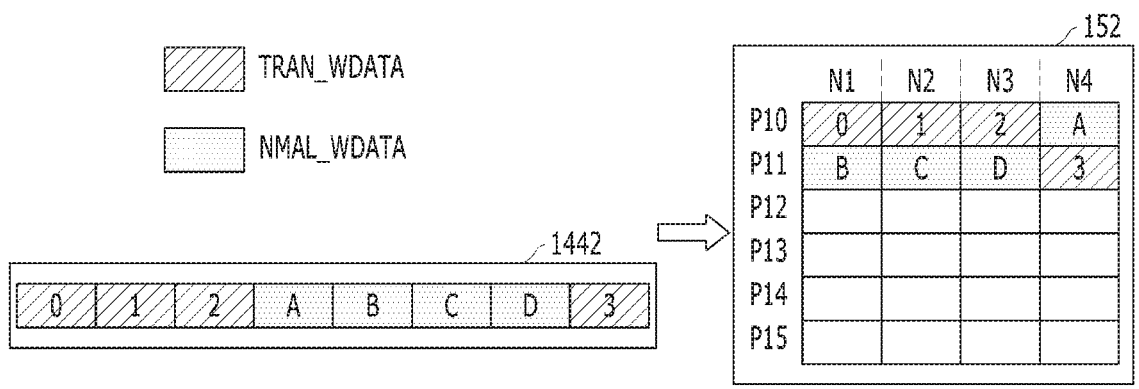

FIG. 6D shows that the transaction manager 1300 stores the write data WDATA stored in the write buffer 1442 into the nonvolatile memory device 150 during the flush operation, through operation 1312 of FIG. 5. That is, the set commit information CMIF and the set abort information ABIF may not be included in the transaction information TRINFO corresponding to the first write data TRAN_WDATA of '0, 1, 2 and 3'. Thus, the transaction manager 1300 may perform operation 1312.

Specifically, FIG. 6D illustrates that each of the write data WDATA stored in the write buffer 1442 is set to a size corresponding to one or more 'sections', similar to FIG. 6A. That is, each of the write data WDATA stored in the write buffer 1442 may be set to a size corresponding to one or more sections less than the unit page.

Therefore, the controller 130 may set one or more 'specific memory blocks' which are simultaneously or consecutively accessed for one read operation among the memory blocks 152, 154 and 156. Then, the controller 130 may use the set one or more memory blocks as a space for storing the first write data TRAN_WDATA which are not completely committed and the second write data NMAL_WDATA, which are selected at operation 1312.

For example, each of '0, 1, 2, A, B, C, D and 3' which are a total of eight write data WDATA stored in the write buffer 1442 has a size corresponding to one section. Therefore, the write buffer 1442 has a size corresponding to a total of eight sections. In this case, the write buffer 1442 may have a size corresponding to a total of two pages since one page includes four sections.

Therefore, the controller 130 may set the first memory block 152 of the memory blocks 152, 154 and 156 to the 'specific memory block'. In this state, the transaction manager 1300 included in the controller 130 may store the eight write data WDATA of '0, 1, 2, A, B, C, D and 3' stored in the write buffer 1442 into eight sections included in the first and second pages P10 and P11 of the first memory block 152 set to the 'specific memory block'. At this time, only the first write data TRAN_WDATA of '0, 1, 2 and 3' grouped into a transaction, among the eight write data WDATA of '0, 1, 2, A, B, C, D and 3' stored in the write buffer 1442, may not be selected and stored in a separate storage space, because the set commit information CMIF and the set abort information ABIF are not included in the transaction information TRINFO corresponding to the first write data TRAN_WDATA of '0, 1, 2 and 3'.

Figure 7:
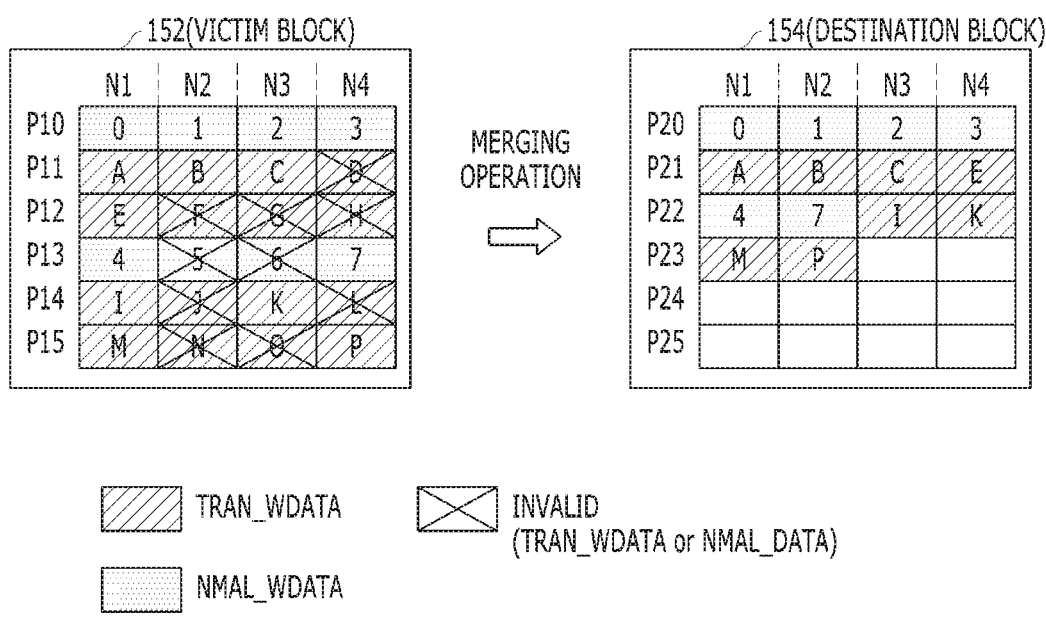
FIG. 7 is a diagram illustrating a method for performing a merging operation after storing a plurality of write data grouped into a transaction in a nonvolatile memory.

FIG. 7 is a diagram illustrating a method for performing a merging operation after storing the plurality of write data grouped into a transaction in the nonvolatile memory device through the operation described with reference to FIGS. 5 and 6A to 6D.

FIG. 7 shows that the controller 130 of FIG. 5 checks whether each of the first write data TRAN_WDATA stored in the 'first storage region' is valid and changes the method for performing the merging operation according to the check result. The operation of FIG. 7 may be performed when performing the merging operation for moving the valid first write data TRAN_WDTA and the valid second write data NMAL_WDATA in the 'first and second storage regions' to another storage region of the nonvolatile memory device 150 after storing the write data TRAN_WDATA grouped into a transaction in the 'first storage region' and storing the second write data NMAL_WDATA which are not grouped into a transaction in the 'second storage region', through the operation described with reference to FIGS. 5 and 6A to 6D.

Specifically, as illustrated in FIG. 7, the first memory block 152 of the memory blocks 152, 154 and 156 of the nonvolatile memory device 150 may be selected as the 'specific memory block'. Each of the first and fourth pages P10 and P13 of the first memory block 152 may be set to the 'first storage region', and each of the second, third, fifth and sixth pages P11, P12, P14 and P15 may be set to the 'second storage region'.

At this time, the first write data TRAN_WDATA of '0, 1, 2 and 3' grouped into the first transaction are stored in the first page P10 of the first memory block 152 set to the 'first storage region'. Furthermore, the first write data TRAN_WDATA of '4, 5, 6 and 7' grouped into the second transaction are stored in the fourth page P13 of the first memory block 152 set to the 'first storage region'. Similarly, the second write data NMAL_WDATA of 'A, B, C, D, E, F, G, H, I, J, K, L, M, N, O and P' are stored in the second, third, fifth and sixth pages P11, P12, P14 and P15 of the first memory block 152, which are set to the 'second storage region'.

Then, while the memory system 110 is operated, the states of some data stored in the first memory block 152 may be transitioned to an invalid state INVALID.

For example, as illustrated in FIG. 7, the states of the data 'D' stored in the fourth section N4 of the second page P11 of the first memory block 152, the data 'F, G and H' stored in the second to fourth sections N2 to N4 of the third page P12, the data '5 and 6' stored in the second and third sections N2 and N3 of the fourth page P13, the data 'J and L' stored in the second and fourth sections N2 and N4 of the fifth page P14, and the data 'N and O' stored in the second and third sections N2 and N3 of the sixth page P15 may be transitioned to the invalid state INVALID.

In this state, the controller 130 may select the first memory block 152 as a victim block VICTIM BLOCK for a merging operation. Therefore, the controller 130 may check whether each of the first write data TRAN_WDATA grouped into a transaction and stored in the first memory block 152 is valid, then change the method for performing the merging operation according to the check result. Therefore, the controller 130 may check whether the first write data TRAN_WDTA of '1, 2, 3 and 4' grouped into the first transaction and stored in the first memory block 152 are all valid, before performing the merging operation. Then, the controller 130 may check whether the first write data TRAN_WDATA of '4, 5, 6 and 7' grouped into the second transaction are all valid.

Through the check result, the controller 130 may recognize that all of the first write data TRAN_WDATA of '1, 2, 3 and 4' grouped into the first transaction retain the valid state. Further, among the first write data TRAN_WDATA of '4, 5, 6 and 7' grouped into the second transaction, the controller 130 may recognize that '5 and 6' are transitioned to the invalid state INVALID and only '4 and 7' retain the valid state. That is, the controller 130 may recognize that all of the first write data TRAN_WDATA of '1, 2, 3 and 4' grouped into the first transaction are valid, and only a part of the first write data TRAN_WDATA of '4, 5, 6 and 7' grouped into the second transaction is valid.

Therefore, when performing the merging operation, the controller 130 may move the first write data TRAN_WDATA of '1, 2, 3 and 4', which are grouped into the first transaction and determined to be valid, to the 'third storage region' of the nonvolatile memory device 150, for example, the first page P10 of the second memory block 154 among the memory blocks 152, 154 and 156 included in the nonvolatile memory device 150. Then, the controller 130 may move the valid data of '4 and 7' among the first write data TRAN_WDATA of '4, 5, 6 and 7' grouped in the second transaction and the valid data of 'A, B, C, E, I, K, M and P', among the second write data NMAL_WDATA which are not grouped into a transaction, to a 'fourth storage region' of the nonvolatile memory device 150, for example, the second, third and fourth pages P21, P22 and P23 of the second memory block 154 among the memory blocks 152, 154 and 156 included in the nonvolatile memory device 150.

In short, the first write data TRAN_WDATA which are grouped into a transaction and all retain the valid state, and the first write data TRAN_WDATA which are grouped into a transaction and partially retain the valid state, may be mixed and stored in the 'first storage region' of the nonvolatile memory device 150. Furthermore, the second write data NMAL_WDATA which are not grouped into a transaction and retain the valid or invalid state may be mixed and stored in the 'second storage region' of the nonvolatile memory device 150.

In this state, when the 'first storage region' and the 'second storage region' of the nonvolatile memory device 150 need to be selected as a victim region to perform the merging operation, the controller 130 may first select the first write data TRAN_WDATA which are grouped in a transaction and all retain the valid state, then move the selected data to the 'third storage region' set to a separate storage space. Then, the controller 130 may mix the valid data of the first write data TRAN_WDATA which are grouped into a transaction and partially retain the valid state, and the valid data of the second write data NMAL_WDATA which are not grouped into a transaction, then move the mixed data to the 'fourth storage region'. Therefore, the first write data TRAN_WDATA which are a grouped into transaction and all retain the valid state may be collected and stored in the storage space which is physically separated from the other data, even after the merging operation is performed.

For reference, the first write data TRAN_WDATA which are grouped into a transaction but not completely committed, as well as the second write data NMAL_WDATA which are not grouped into a transaction and retain the valid or invalid state, may be further stored in the 'second storage region' of the nonvolatile memory device 150 while retaining the valid or invalid state. However, the first write data TRAN_WDATA which are grouped into a transaction but not completely committed may not be distinguished from the second write data NMAL_WDATA which are not grouped into a transaction, but already mixed with the second write data NMAL_WDATA, at the point of time that the first write data TRAN_WDATA are stored in the 'second storage region' as in operation 1312. That is, the first write data TRAN_WDATA which are grouped into a transaction but not completely committed may be managed in the same manner as the second write data NMAL_WDATA which are not grouped into a transaction, from the point of time that the first write data TRAN_WDATA are stored in the 'second storage region' of the nonvolatile memory device 150.

In the above-described embodiment, the 'merging operation' may indicate a garbage collection operation. However, the 'merging operation' is not limited to only the garbage collection operation, but an operation for merging two or more blocks, for example, a read reclaim operation or wear leveling operation may also be included in the 'merging operation'.

Figure 8:
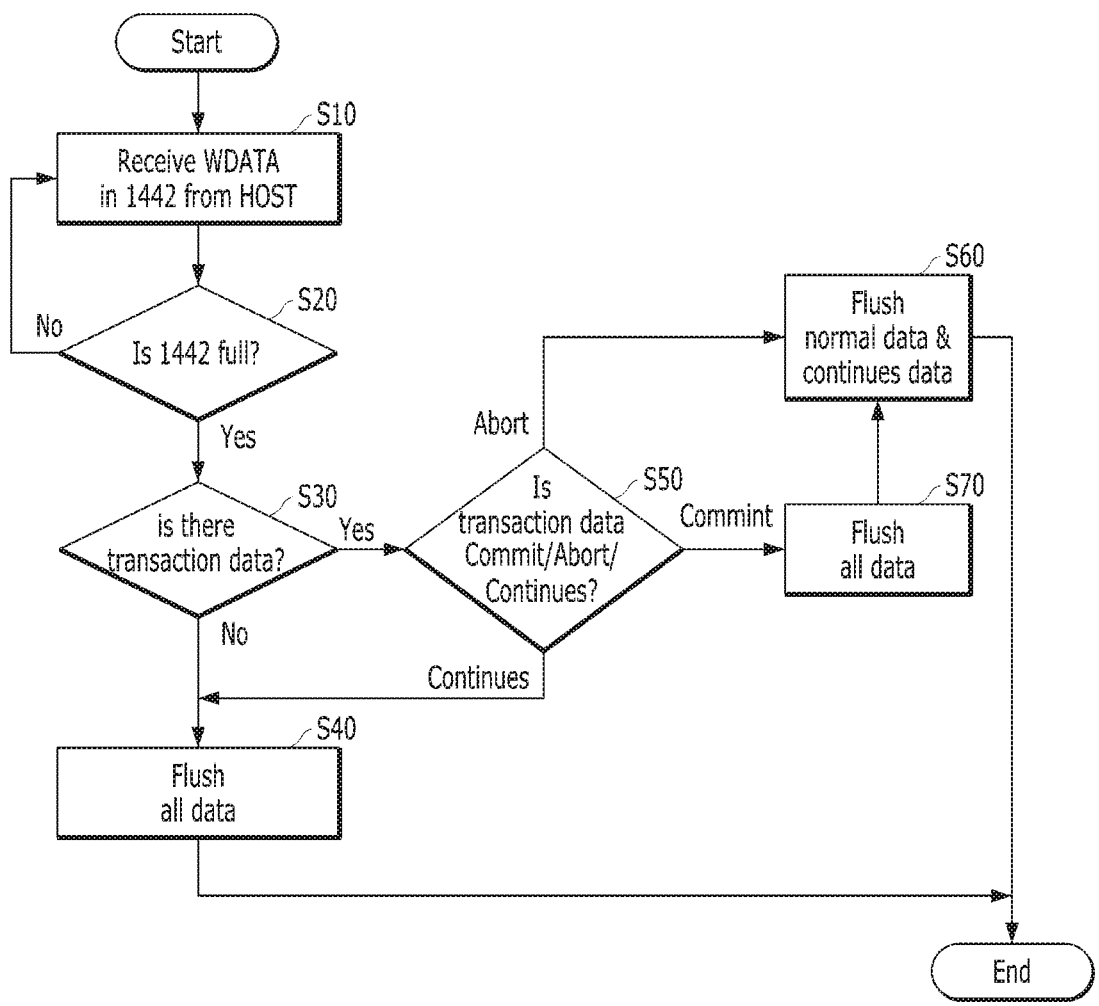
FIG. 8 is a flowchart illustrating an operation of storing a plurality of write data grouped into a transaction in a nonvolatile memory device of a memory system in accordance with the present embodiment.

FIG. 8 is a flowchart illustrating an operation of storing a plurality of write data grouped into a transaction in a nonvolatile memory device in a memory system in accordance with the present embodiment.

FIG. 8 shows the sequence of the operation of storing the plurality of write data grouped into a transaction in the nonvolatile memory device in the memory system in accordance with the embodiment, which has been described with reference to FIGS. 5 and 6A to 6D.

At step S10, the write data WDATA may be received from the host 102 and stored in the write buffer 1442.

At step S20, the controller 130 may check whether the predetermined storage space of the write buffer 1442 is full. At this time, examples of step S20 may include checking whether the storage space allocated to the write buffer 1442 in the volatile memory device 144 is full.

When it is checked that the predetermined storage space of the write buffer 1442 is not full (S20, NO), step S10 may be performed again.

When the check result of step S20 indicates that the predetermined storage space of the write buffer 1442 is full (S20, YES), the controller 130 needs to perform a flush operation on the write buffer 1442. At this time, before performing a flush operation on the write buffer 1442, at step S30, the controller 130 may check whether the first write data TRAN_WDATA grouped into a transaction are present among the write data WDATA stored in the write buffer 1442.

When the check result of step S30 indicates that the first write data TRAN_WDATA grouped into a transaction are not present in the write buffer 1442 (S30, NO), at step S40, the controller 130 may perform a flush operation on the write buffer 1442. That is, all of the write data WDATA stored in the write buffer 1442 may be stored in the nonvolatile memory device 150.

When the result of step S30 indicates that the first write data TRAN_WDATA grouped into a transaction are present in the write buffer 1442 (S30, YES), at step S50, the controller 130 may check the state of the first write data TRAN_WDATA grouped into a transaction and stored in the write buffer 1442. Through step S50, the controller 130 may check whether the first write data TRAN_WDATA grouped into a transaction and stored in the write buffer 1442 have been completely committed (Commit) or aborted (Abort) or are not completely committed (Continues).

When the result of step S50 indicates that the committed first write data TRAN_WDATA are included in the first write data TRAN_WDATA grouped into a transaction and stored in the write buffer 1442 (S50, Commit), at step S70, the controller 130 may select only the committed first write data TRAN_WDATA grouped into a transaction (i.e., commit data) and store the selected data in the 'first storage region' of the nonvolatile memory device 150, through the first flush operation FLUSH1. When the operation of step S70 is performed, at step S60 following step S70, the controller 130 may select the other data stored in the write buffer 1442, that is, the second write data NMAL_WDATA which are not grouped into a transaction (i.e., normal data) and the first write data TRAN_WDATA which are grouped into a transaction but not completely committed (i.e., continues data), then store the selected data in the 'second storage region' of the nonvolatile memory device 150.

When the result of step S50 indicates that the aborted first write data TRAN_WDATA are included in the first write data TRAN_WDATA grouped into a transaction and stored in the write buffer 1442 (S50, Abort), at step S60, the controller 130 may select the other data excluding the first write data TRAN_WDATA which are grouped into a transaction but aborted, among the write data WDATA stored in the write buffer 1442, That is, the controller 130 may select the second write data NMAL_WDATA which are not grouped into a transaction (normal data) and the first write data TRAN_WDATA which are grouped into a transaction but not completely committed (continues data). Then, the controller 130 may store the selected data in the nonvolatile memory device 150, through the flush operation.

When the result of step S50 indicates that the committed first write data TRAN_WDATA and the aborted first write data TRAN_WDATA are not included in the first write data TRAN_WDATA grouped into a transaction and stored in the write buffer 1442, but only the first write data TRAN_W-DATA which are not completely committed are included (S50, Continue), at step S40, the controller 130 may perform the flush operation on the write buffer 1442. That is, all of the write data WDATA stored in the write buffer 1442 may be stored in the nonvolatile memory device 150.

Hereafter, referring to FIGS. 9 to 17, a data processing system and electronic devices, to which the memory system 110 including the memory device 150 and the controller 130 that are described with reference to FIGS. 1 to 8 in accordance with the present embodiment is applied, will be described in more detail.

FIGS. 9 to 17 are diagrams illustrating application examples of the data processing system of FIG. 1.

Figure 9:
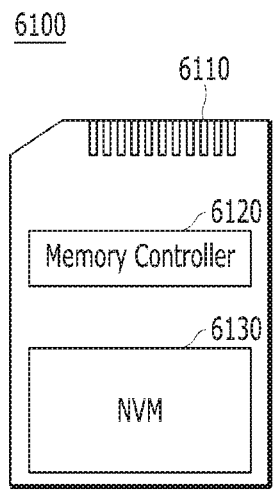
FIGS. 9 to 17 are diagrams illustrating application examples of a data processing system in accordance with various embodiments of the present invention.

FIG. 9 is a diagram illustrating another example of a data processing system including a memory system in accordance with the present embodiment. For example, FIG. 9 illustrates a memory card system 6100 to which the memory system in accordance with the present embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a random access memory (RAM), a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), advanced technology attachment (ATA), serial-ATA, parallel-ATA, small computer system interface (SCSI), enhanced small disk interface (EDSI), integrated drive electronics (IDE), Firewire, universal flash storage (UFS), wireless fidelity (Wi-Fi or WiFi) and Bluetooth. Thus, the memory system and the data processing system in accordance with the present embodiment may be applied to wired/wireless electronic devices or particularly mobile electronic devices.

The memory device 6130 may be implemented by a nonvolatile memory (NVM). For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state drive (SSD) by being integrated into a single semiconductor device. Also, the memory controller 6120 and the memory device 6130 may construct a memory card such as a PC card (personal computer memory card international Association (PCM-CIA)), a compact flash (CF) card, a smart media card (e.g., SM and SMC), a memory stick, a multimedia card (e.g., MMC, RS-MMC, MMCmicro and eMMC), a secure digital (SD) card (e.g., SD, miniSD, microSD and SDHC) and a universal flash storage (UFS).

Figure 10:
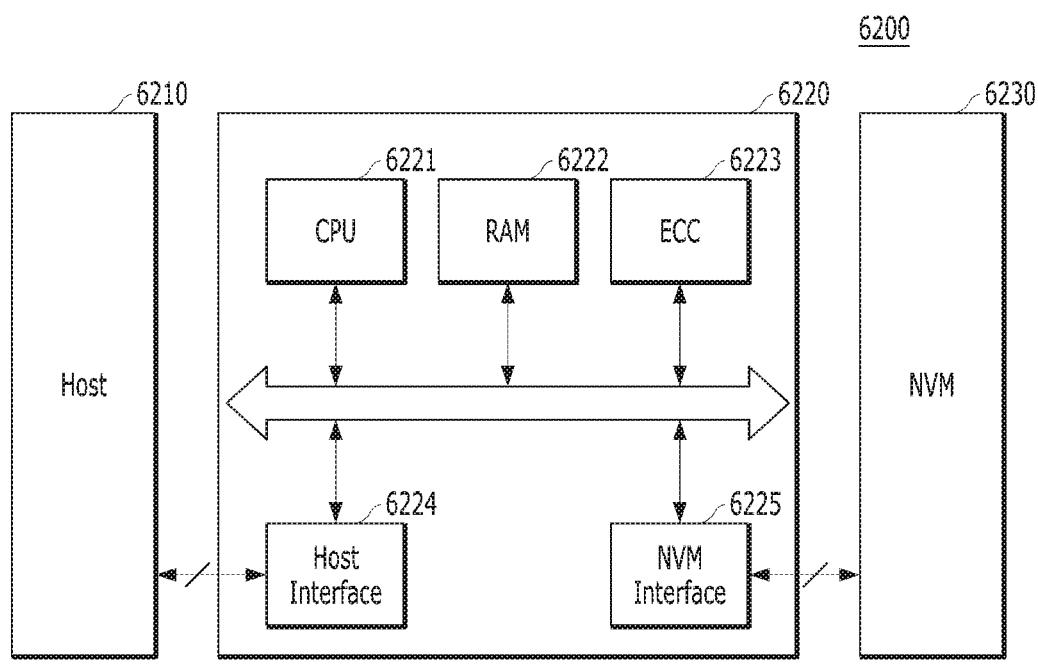

FIG. 10 is a diagram illustrating another example of a data processing system 6200 including a memory system in accordance with the present embodiment.

Referring to FIG. 10, the data processing system 6200 may include a memory device 6230 having one or more nonvolatile memories (NVMs) and a memory controller 6220 for controlling the memory device 6230. The data processing system 6200 illustrated in FIG. 10 may serve as a storage medium such as a memory card (e.g., CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an nonvolatile memory (NVM) interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the low density parity check (LDPC) code, Bose-Chaudhri-Hocquenghem (BCH) code, turbo code, Reed-Solomon (RS) code, convolution code, recursive systematic code (RSC) or coded modulation such as trellis coded modulation (TCM) or block coded modulation (BCM).

The memory controller 6220 may transmit/receive data to/from the host 6210 through the host interface 6224, and transmit/receive data to/from the memory device 6230 through the NVM interface 6225. The host interface 6224 may be connected to the host 6210 through a parallel advanced technology attachment (PATA) bus, a serial advanced technology attachment (SATA) bus, a small computer system interface (SCSI), a universal serial bus (USB), a peripheral component interconnect-express (PCIe) or a NAND interface. The memory controller 6220 may have a wireless communication function with a mobile communication protocol such as wireless fidelity (WiFi) or long term evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
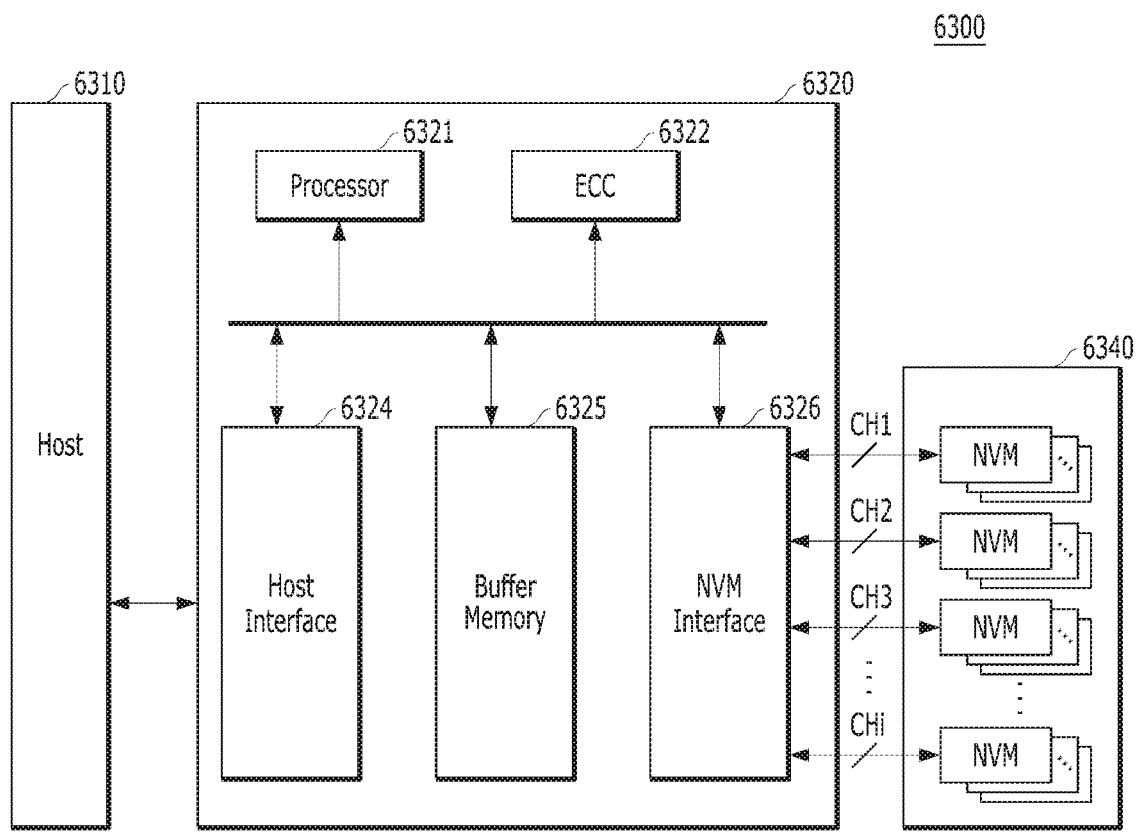

FIG. 11 is a diagram illustrating another example of a data processing system including a memory system in accordance with the present embodiment. For example, FIG. 11 illustrates a solid state drive (SSD) 6300 to which the memory system in accordance with the present embodiment is applied.

Referring to FIG. 11, the SSD 6300 may include a controller 6320 and a memory device 6340 including a plurality of nonvolatile memories (NVMs). The controller 6320 may correspond to the controller 130 in the memory system 110 of FIGS. 1 and 5, and the memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as a dynamic random access memory (DRAM), a synchronous DRAM (SDRAM), a double data rate (DDR) SDRAM, a low power DDR (LPDDR) SDRAM and a graphics RAM (GRAM) or nonvolatile memories such as a ferroelectric RAM (FRAM), a resistive RAM (RRAM or ReRAM), a spin-transfer torque magnetic RAM (STT-MRAM) and a phase-change RAM (PRAM). For convenience, FIG. 11 illustrates that the buffer memory 6325 exists in the controller 6320. However, the buffer memory 6325 may exist outside the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, a redundant array of independent disks (RAID) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
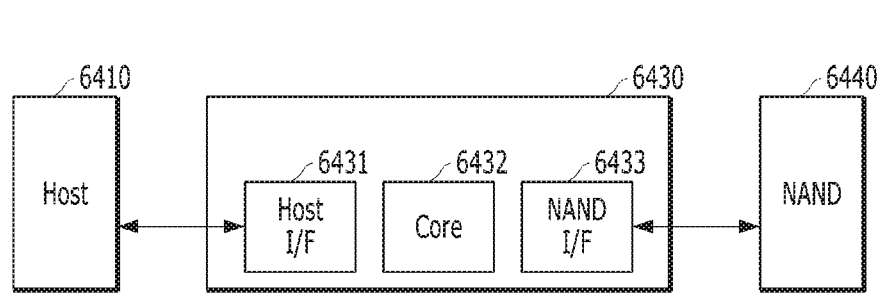

FIG. 12 is a diagram illustrating another example of a data processing system including a memory system in accordance with the present embodiment. For example, FIG. 12 illustrates an embedded multi-media card (eMMC) 6400 to which the memory system in accordance with the present embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 and 5, and the memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, ultra high speed (UHS)-I/UHS-II interface.

FIGS. 13 to 16 are diagrams illustrating other examples of a data processing system including a memory system in accordance with the present embodiment. For example, FIGS. 13 to 16 illustrate universal flash storage (UFS) systems to which the memory system in accordance with the present embodiment is applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI unified protocol (UniPro) in mobile industry processor interface (MIPI). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 13:
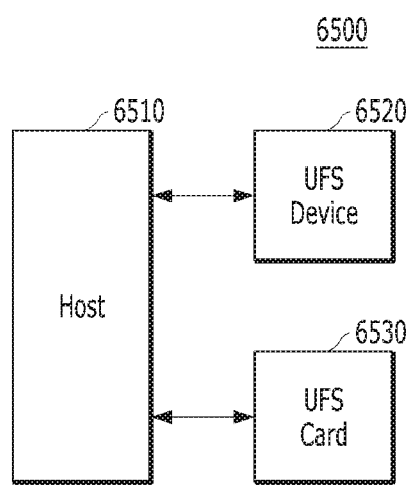

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
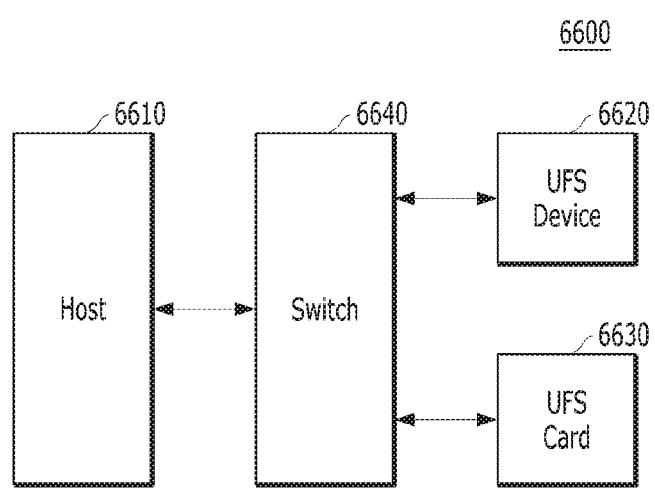

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
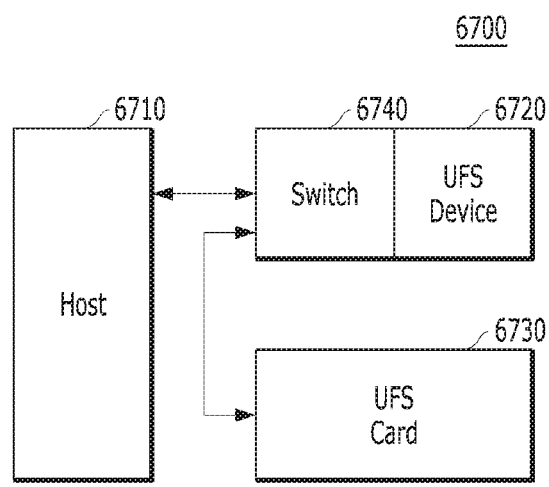

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
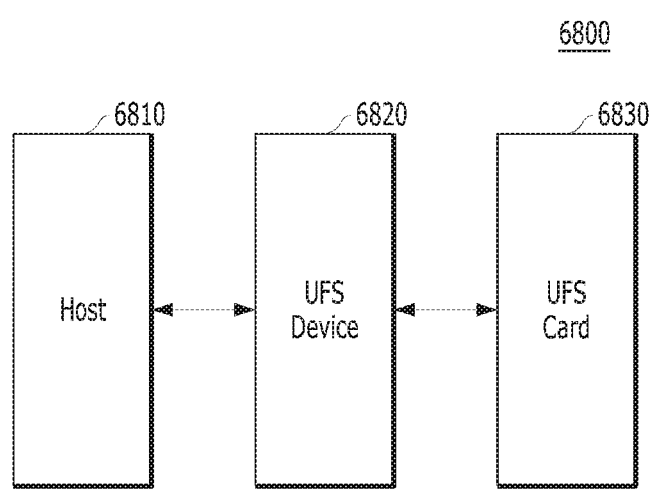

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target identifier (ID) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
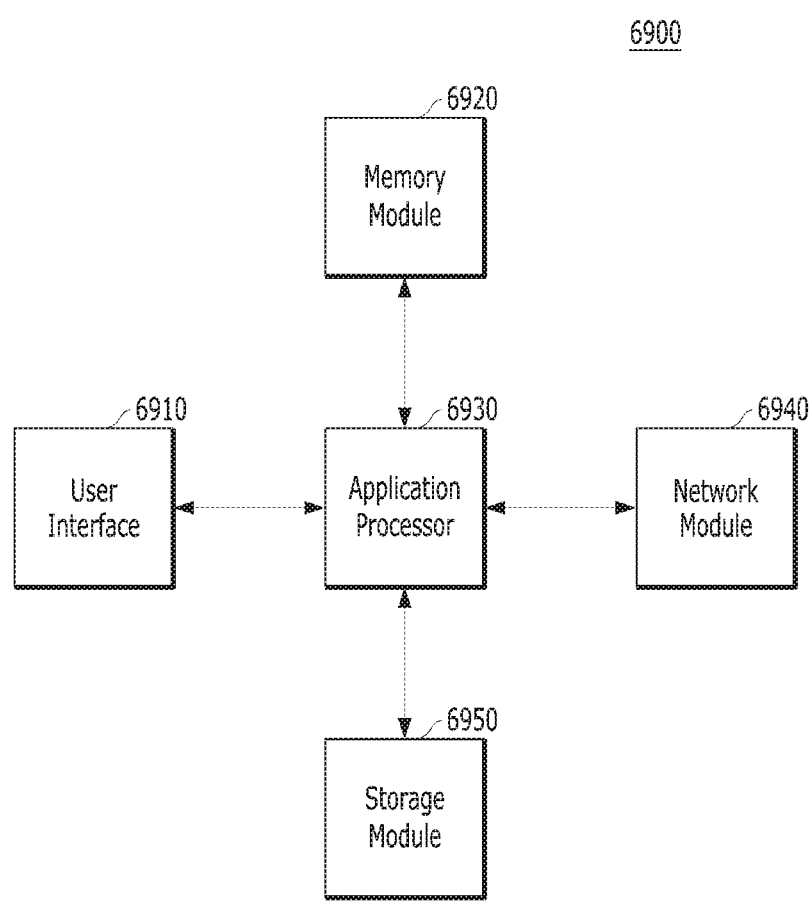

FIG. 17 is a diagram illustrating another example of a data processing system including a memory system in accordance with an embodiment. For example, FIG. 17 is a diagram illustrating a user system 6900 to which the memory system in accordance with the present embodiment is applied.

Referring to FIG. 17, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, a low power DDR (LPDDR) SDARM, LPDDR3 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on package on package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

In accordance with the present embodiments, the memory system may adjust the method of storing a plurality of write data grouped into a transaction in the memory blocks according to whether the transaction has been committed, when temporarily storing the plurality of write data grouped into the transaction in the write buffer within the memory system and then storing the write data in the memory blocks through the flush operation for the write buffer.

Therefore, the memory system may effectively read the plurality of write data grouped into the transaction and stored in the memory blocks.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a nonvolatile memory device;
a write buffer configured to temporarily store a plurality of write data received from a host; and
a controller configured to:
check whether first write data have been committed at a point of time that a flush operation is performed on the write buffer,
separate the flush operation into first and second flush operations which do not overlap each other but are consecutive to each other, according to the check result, and
perform the first and second flush operations, when the first write data grouped into a transaction and second write data, which are not grouped into a transaction, are mixed according to the sequence of the write data received from the host and stored in the write buffer,
wherein among the write data stored in the write buffer, the controller selects and stores the first write data which are committed, in a first storage region of the nonvolatile memory device during the first flush operation, and selects and stores the first write data which are not completely committed and the second write data, in a second storage region of the nonvolatile memory device during the second flush operation.

2. The memory system of claim 1, wherein the controller receives a plurality of write commands corresponding to the respective write data from the host,
wherein each of the write commands comprises transaction information of the corresponding write data, and
wherein the transaction information of each of the write data comprises transaction identify (ID) information, commit information, and abort information.

3. The memory system of claim 2, wherein the controller checks the transaction ID information of the transaction information of the respective write data, sorts the write data having no transaction ID information set therein into the second write data, and sorts the write data having the transaction ID information set to a specific value into the first write data.

4. The memory system of claim 3, wherein the controller performs the flush operation when a predetermined storage space of the write buffer is full,
wherein, when it is checked that the set commit information is included in the transaction information of the respective first write data at the point of time that the flush operation is performed, the controller selects and stores the first write data which are committed among the write data stored in the write buffer in the first storage region during the first flush operation, and selects and stores the first write data which are not completely committed and the second write data in the second storage region during the second flush operation.

5. The memory system of claim 4, wherein, when it is checked that the set commit information is not included in the transaction information of the respective first write data at the point of time that the flush operation is performed, the controller selects and programs the first write data which are not completely committed and the second write data, among the write data stored in the write buffer, to the nonvolatile memory device, during the flush operation.

6. The memory system of claim 5, wherein, when it is checked that the set abort information is included in the transaction information of the respective first write data at the point of time that the flush operation is performed, the controller does not program the aborted first write data of the write data stored in the write buffer to the nonvolatile memory device even during the flush operation.

7. The memory system of claim 1, wherein the nonvolatile memory device comprises a plurality of memory blocks, and each of the memory blocks comprises a plurality of pages,
wherein, when each of the write data is set to a size corresponding to one or more pages, the controller sets one or more specific memory blocks to the first storage region, the one or more specific blocks being simultaneously or consecutively accessed for one read operation among the memory blocks, and sets one or more memory blocks of the other memory blocks excluding the specific memory block from the memory blocks to the second storage region.

8. The memory system of claim 1, wherein the nonvolatile memory device comprises a plurality of memory blocks, each of the memory blocks comprises a plurality of pages, and each of the pages comprises a plurality of sections,
wherein, when each of the write data is set to a size corresponding to one or more sections, the controller sets one or more specific pages to the first storage region, the one or more specific pages being included in one or more specific memory blocks which are simultaneously or consecutively accessed for one read operation among the memory blocks, and sets one or more pages of the other pages excluding the specific page from the specific memory block to the second storage region.

9. The memory system of claim 3, wherein, when performing a merging operation for moving the valid first and second write data in the first and second storage regions to another storage region of the nonvolatile memory device after the first and second write data are stored in the first and second storage regions through the first and second flush operations, the controller checks whether the first write data stored in the first storage region are all valid and changes a method for performing the merging operation according to the check result.

10. The memory system of claim 9, wherein, when performing the merging operation after the first write data having the transaction ID information set to a first value and the first write data having the transaction ID information set to a second value are stored in the first storage region, the controller moves the first write data having the transaction ID information set to the first value to a third storage region of the nonvolatile memory device, and moves the valid data of the first write data having the transaction ID information set to the second value and the valid data of the second write data to a fourth storage region of the nonvolatile memory device, when the first write data having the transaction ID information set to the first value are all valid and only a part of the first write data having the transaction ID information set to the second value is valid.

11. An operating method for a memory system which includes a nonvolatile memory device and a write buffer for temporarily storing a plurality of write data received from a host, the operating method comprising:
   a first check step of checking whether first write data grouped into a transaction and second write data which are not grouped into a transaction are mixed and stored in the write buffer according to the sequence of the write data received from the host;
   a second check step of checking whether the first write data have been committed at a point of time that a flush operation is performed on the write buffer, when the result of the first check step indicates that the first and second write data are mixed and stored in the write buffer;
   a separation step of separating the flush operation for the write buffer into first and second flush operations which do not overlap each other but are consecutive to each other, according to the result of the second check step; and
   a storage step of selecting and storing the first write data which are committed, among the write data stored in the write buffer, in a first storage region of the nonvolatile memory device during the first flush operation, and selecting and storing the first write data which are not completely committed and the second write data among the write data stored in the write buffer, in a second storage region of the nonvolatile memory device during the second flush operation.

12. The operating method of claim 11, further comprising receiving a plurality of write commands corresponding to the respective write data from the host,
   wherein each of the write commands comprises transaction information of the corresponding write data, and
   wherein the transaction information of the respective write data comprises transaction identify (ID) information, commit information, and abort information.

13. The operating method of claim 12, wherein the first check step comprises:
   a first sorting step of checking the transaction ID information of the transaction information of the respective write data, and sorting the write data having no transaction ID information set therein into the second write data;
   a second sorting step of checking the transaction ID information of the transaction information of the respective write data, and sorting the write data having the transaction ID information set to a specific value into the first write data; and
   a third check step of checking whether the first and second write data are mixed and stored in the write buffer, after sorting the write data stored in the write buffer into the first and second write data through the first and second sorting steps.

14. The operating method of claim 13, further comprising a flush operation step of performing the flush operation when a predetermined storage space of the write buffer is full,
   wherein, when the result of the third check step indicates that the first and second write data are mixed and stored in the write buffer, the second check step comprises checking whether the set commit information is included in the transaction information of the respective first write data at the point of time that the flush operation step is performed.

15. The operating method of claim 14, further comprising:
   performing the separation step and the storage step when it is checked at the second check step that the set commit information is included in the transaction information of the respective first write data, at the point of time that the flush operation step is started; and
   selecting the first write data which are not completely committed and the second write data among the write data stored in the write buffer and programming the selected data to the nonvolatile memory device during the flush operation, when it is checked at the second check step that the set commit information is not included in the transaction information of the respective first write data, at the point of time that the flush operation step is started.

16. The operating method of claim 15, further comprising checking whether the set abort information is included in the transaction information of the respective first write data at the point of time that the flush operation step is performed, and not programming the aborted first write data of the write data stored in the write buffer to the nonvolatile memory device even during the flush operation, when the check result indicates that the abort information is included.

17. The operating method of claim 11, wherein the nonvolatile memory device comprises a plurality of memory blocks, and each of the memory blocks comprises a plurality of pages,
   wherein the operating method further comprises setting one or more specific memory blocks to the first storage region, the one or more specific memory blocks being simultaneously or consecutively accessed for one read operation among the memory blocks, and setting one or more memory blocks among the other memory blocks excluding the specific memory block from the memory blocks to the second storage region, when each of the write data is set to a size corresponding to one or more pages.

18. The operating method of claim 11, wherein the nonvolatile memory device comprises a plurality of memory blocks, each of the memory blocks comprises a plurality of pages, and each of the pages comprises a plurality of sections,
   wherein the operating method further comprises setting one or more specific pages to the first storage region, the one or more specific pages being included in one or more memory blocks which are simultaneously or consecutively accessed for one read operation among the memory blocks, and setting one or more pages among the other pages excluding the specific page from the specific memory block to the second storage region, when each of the write data is set to a size corresponding to one or more sections.

19. The operating method of claim 13, further comprising, when a merging operation for moving the valid first and second write data in the first and second storage regions to another storage region of the nonvolatile memory device is performed after the first and second write data are stored in the first and second storage regions through the first and second flush operations at the separation step and the storage step,
- a fourth check step whether the first write data stored in the first storage region are all valid; and
- a merging operation step of changing a method for performing the merging operation according to the result of the fourth check step.

20. The operating method of claim 19, wherein, when the merging operation is performed after the first write data having the transaction ID information set to a first value and the first write data having the transaction ID information set to a second value are stored in the first storage region at the second sorting step,
- the merging operation step comprises moving the first write data having the transaction ID information set to the first value to a third storage region of the nonvolatile memory device, and then moving valid data of the first write data having the transaction ID information set to the second value and valid data of the second write data to a fourth storage region of the nonvolatile memory device, when it is checked at the fourth check step that the first write data having the transaction ID information set to the first value are all valid and only a part of the first write data having the transaction ID information set to the second value is valid.

* * * * *